(12) United States Patent
Matsuura et al.

(10) Patent No.: US 6,950,377 B2
(45) Date of Patent: Sep. 27, 2005

(54) INFORMATION RECORDING METHOD AND INFORMATION RECORDING APPARATUS

(75) Inventors: Takumi Matsuura, Kyoto (JP); Tsutomu Kai, Osaka (JP); Masaharu Imura, Osaka (JP)

(73) Assignee: Matsushita Electric Industial Co., Ltd., Osaka (JP)

( * ) Notice: Subject to any disclaimer, the term of this patent is extended or adjusted under 35 U.S.C. 154(b) by 161 days.

(21) Appl. No.: 10/362,854

(22) PCT Filed: Jun. 25, 2002

(86) PCT No.: PCT/JP02/06345

§ 371 (c)(1),
(2), (4) Date: Aug. 13, 2003

(87) PCT Pub. No.: WO03/001519

PCT Pub. Date: Jan. 3, 2003

(65) Prior Publication Data

US 2004/0027949 A1 Feb. 12, 2004

(30) Foreign Application Priority Data

Jun. 26, 2001 (JP) ........................................ 2001-192219

(51) Int. Cl.$^7$ ................................................. G11B 5/09
(52) U.S. Cl. .................. 369/47.5; 369/47.53; 369/53.1; 369/53.11; 369/59.11
(58) Field of Search ............................... 369/47.1, 47.5, 369/47.51, 47.53, 47.55, 53.1, 53.11, 53.37, 53.45, 59.1, 59.11, 116

(56) References Cited

U.S. PATENT DOCUMENTS 5,029,155 A * 7/1991 Kenjo ........................ 369/116
5,790,482 A * 8/1998 Saga et al. ............... 369/13.27

(Continued)

FOREIGN PATENT DOCUMENTS

JP 7-57268 3/1995
JP 09-017007 1/1997

(Continued)

OTHER PUBLICATIONS

PCT Search Report for Application No. PCT/JP02/06345 dated Oct. 9, 2002.

(Continued)

*Primary Examiner*—Muhammad Edun
(74) *Attorney, Agent, or Firm*—RatnerPrestia

(57) ABSTRACT

An information recording method of recording information, in which laser light is applied to a recording medium while depending on predetermined information said laser light is modulated and the intensity of said light is controlled to form recording mark areas at which reflectivity of said recording medium changes, depending on the intensity of said applied light, wherein before starting data recording, said light is applied to said recording medium at predetermined light intensity, reflection light from said recording mark areas of said recording medium is received, the amount of said reflection light is detected, and a light intensity controlling reference value is calculated on the basis of the amount of said detected light, and during data recording, reflection light from said recording mark areas of said recording medium is received, the amount of said reflection light is detected, and a light intensity controlling detection value is calculated on the basis of the amount of said detected light, corrected light intensity is obtained from the difference between said light controlling intensity reference value and said light intensity controlling detection value, said light intensity controlling reference value is corrected depending on said corrected light intensity, and the intensity of said laser light is controlled so that said corrected light intensity controlling reference value substantially coincides with said light intensity controlling detection value.

16 Claims, 19 Drawing Sheets

U.S. PATENT DOCUMENTS

| | | | |
|---|---|---|---|
| 6,222,815 B1 | 4/2001 | Nagano | |
| 6,272,100 B1 | 8/2001 | Toda et al. | |
| 6,304,533 B2 | 10/2001 | Toda et al. | |
| 6,445,659 B2 | 9/2002 | Toda et al. | |
| 6,664,526 B2 * | 12/2003 | Yokoi | 369/59.19 |
| 2001/0007548 A1 | 7/2001 | Toda et al. | |
| 2001/0015945 A1 | 8/2001 | Toda et al. | |
| 2002/0015368 A1 | 2/2002 | Toda et al. | |
| 2002/0036961 A1 | 3/2002 | Eguchi et al. | |
| 2002/0105878 A1 | 8/2002 | Ogata et al. | |

FOREIGN PATENT DOCUMENTS

| | | |
|---|---|---|
| JP | 10-40548 | 2/1998 |
| JP | 11-250459 | 9/1999 |
| JP | 2000-295734 | 10/2000 |
| JP | 2002-109739 | 4/2002 |
| JP | 2002-133694 | 5/2002 |
| JP | 10-289461 | 9/2002 |

OTHER PUBLICATIONS

English Translation Form PCT/ISA/210.

* cited by examiner

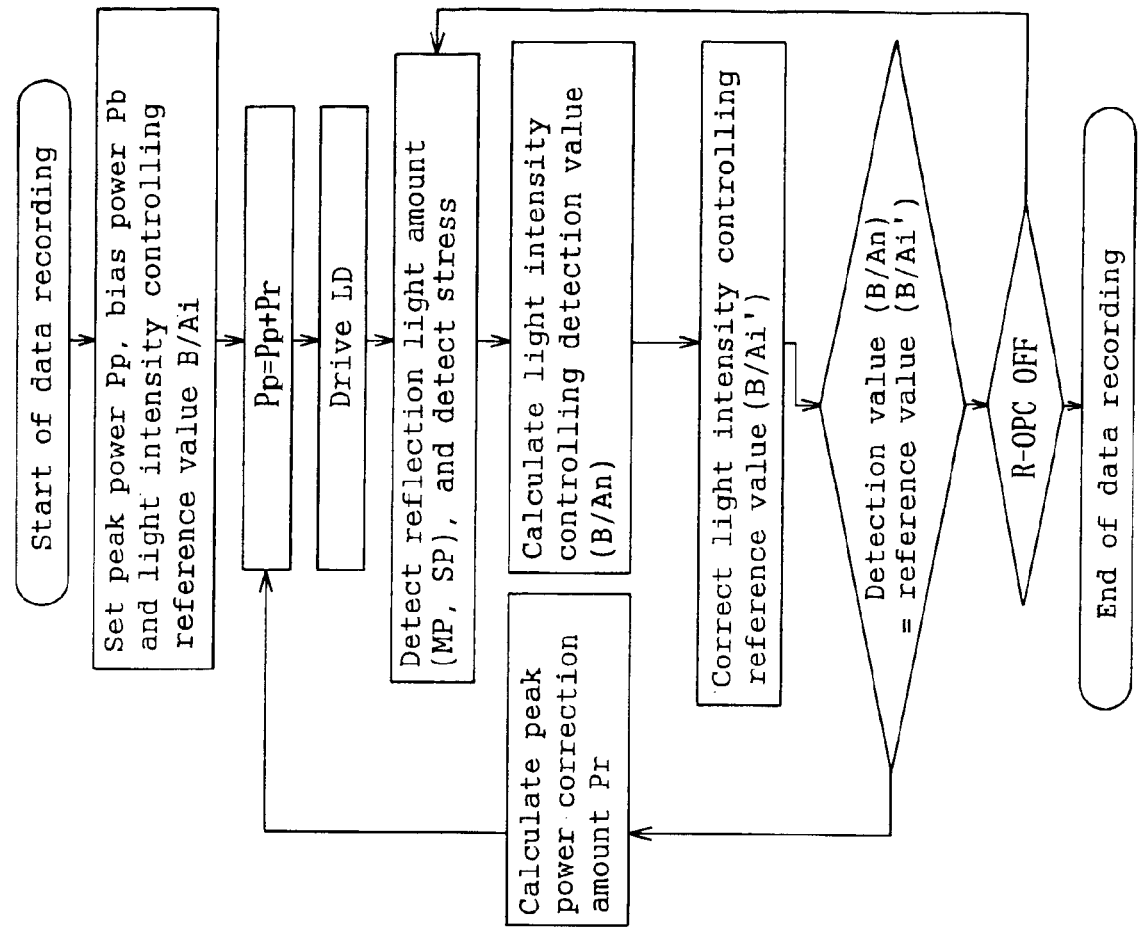
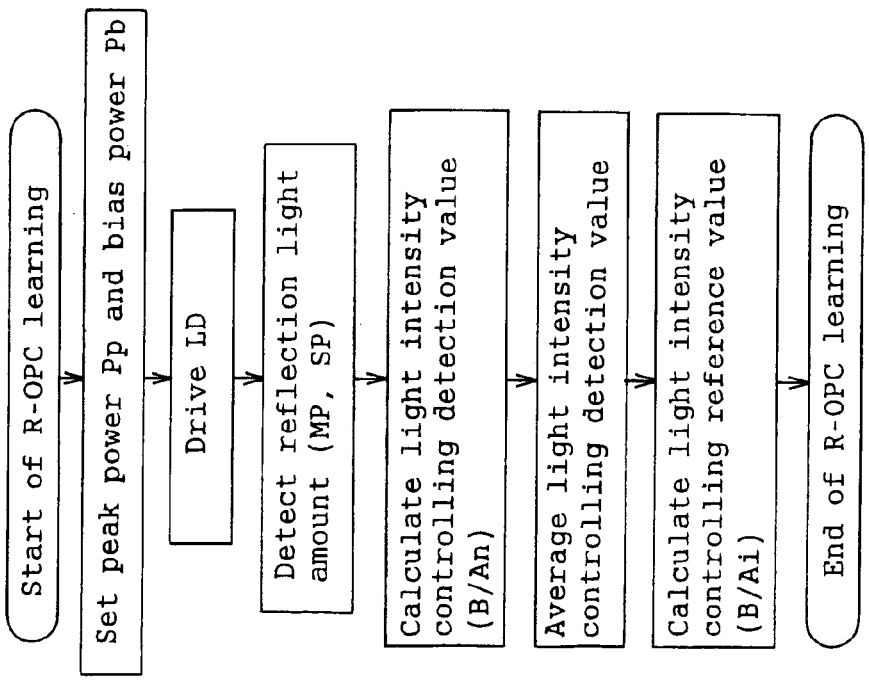
Fig. 13

Fig. 18

Corrected light intensity correction table & light intensity temperature correction table

| DISC type | Ps | -Ps' | k | Px |
|---|---|---|---|---|
| A | a1 | a2 | a3 | a4 |
| B | b1 | b2 | b3 | b4 |
| C | c1 | c2 | c3 | c4 |
| ... | ... | ... | ... | ... |
| Z | z1 | z2 | z3 | z4 |

INFORMATION RECORDING METHOD AND INFORMATION RECORDING APPARATUS

This Application is a U.S. National Phase Application OF PCT International Application PCT/JP02/06345 filed Jun. 25, 2002.

TECHNICAL FIELD

The present invention relates to an information recording method and an information recording apparatus of recording information, in which laser light is applied to a recording medium while the laser light is modulated and the intensity of the light is controlled depending on predetermined information to form recording mark areas at which the reflectivity of the above-mentioned recording medium changes depending on the intensity of the applied light.

BACKGROUND TECHNOLOGY

With the widespread use of multimedia in recent years, a write-once optical disk, i.e., CD-R, and a rewritable optical disk, i.e., CD-RW, have come into widespread use quickly, and optical disks having larger capacities, such as a write-once optical disk, i.e., DVD-R, and rewritable optical disks, i.e., DVD-RW and DVD-RAM, are put to practical use and beginning to be used widely. In order to record information, each of these optical disks is used with an information recording/reproducing apparatus including an optical pickup system having a semiconductor laser as a light source. Various technological developments have been carried out to enhance and stabilize the recording and reproduction performance of these information recording/reproducing apparatuses. A semiconductor laser power control technology is one of the technologies, and numerous systems have been proposed. In particular, in the case of the write-once optical disk, since no data can be rewritten, it becomes important how a stable recording state can be maintained. The laser power control systems includes, for example, a system referred to as APC (Auto Power Control) wherein part of the amount of outgoing laser light is detected and laser power is controlled so that outgoing power is maintained constant, and a system referred to as R-OPC (Running-Optimum Power Control) wherein the amount of reflection light from a recording medium is detected during recording, and laser power is controlled so that the amount of reflection light from the recording mark areas of the recording medium becomes a predetermined amount of light.

For example, as disclosed in Japanese Patent Application No. 2000-295734, a system is proposed wherein laser power is controlled in combination with APC and R-OPC by using the recording waveform of a multi-pulse train with pulses having different widths for mark areas.

FIG. 7 is a block diagram showing a prior art information recording apparatus of carrying out laser power control in combination with APC and R-OPC, and FIG. 8 shows the detection signal waveforms for APC and the detection signal waveforms for R-OPC in the prior art information recording apparatus that uses the recording waveform of a multi-pulse train with pulses having different widths for mark areas.

Numeral 101 designates an optical disk capable of recording and reproducing information. Numeral 102 designates a spindle motor of rotating the optical disk 101.

Numeral 103 designates a laser diode capable of emitting light by using a multi-pulse train with pulses having different widths for mark areas during recording on the optical disk 101. Numeral 104 designates a beam splitter of separating the outgoing light of the laser diode 103 and the return light from the optical disk 101. Numeral 105 designates an objective lens of gathering laser light in recordable or reproducible areas of the optical disk 101.

Numeral 106 designates a light amount monitoring photodetector of detecting part of the outgoing light emitted from the laser diode 103. Numeral 107 designates an I/V conversion circuit of converting the current output of the light amount monitoring photodetector 106 into a voltage.

Numeral 108 designates a low-pass filter (LPF) of attenuating the frequency band of the output of the I/V conversion circuit 107. Numeral 109 designates a voltage amplifier (AMP) of amplifying the current output of the light amount monitoring photodetector 106. Numeral 110 designates a sample-and-hold circuit (S/H) of sampling and holding the output of the LPF 108 at predetermined timing. Numeral 111 designates a sample-and-hold circuit (S/H) of sampling and holding the output of the AMP 109 at predetermined timing.

Numeral 112 designates an mp detector of detecting the output of the S/H 110 as the average power of recording light emission for a multi-pulse train.

Numeral 113 designates an sp detector of detecting the output of the S/H 111 as the bias power of recording light emission for a multi-pulse train.

Numeral 114 designates a peak power control circuit of controlling the peak power of the recording light emission for a multi-pulse train.

Numeral 115 designates a bias power control circuit of controlling the bias power of the recording light emission for a multi-pulse train. Numeral 116 designates an LD drive circuit of driving the laser diode 103 to emit light by using power and a multi-pulse train with pulses having different widths controlled by the peak power control circuit 114 and the bias power control circuit 115.

Numeral 117 designates a plurality of return light detecting photodetectors of detecting return light from the optical disk 101. Numeral 118 designates a plurality of I/V conversion circuits of converting each of the current outputs of the plurality of return light detecting photodetectors 117 into a voltage.

Numeral 119 designates an RF adder of adding the outputs of the plurality of I/V conversion circuits 118. Numeral 120 designates a low-pass filter (LPF) of attenuating the frequency band of the output of the RF adder 119. Numeral 121 designates a voltage amplifier (AMP) of amplifying the output of the LPF 120. Numeral 122 designates a sample-and-hold circuit (S/H) of sampling and holding the output of the LPF 120 at predetermined timing. Numeral 123 designates a sample-and-hold circuit (S/H) of sampling and holding the output of the AMP 121 at predetermined timing.

Numeral 124 designates an MP detector of detecting the output of the S/H 122 as the average amount of return light from the mark areas of the optical disk 101 during recording.

Numeral 125 designates an SP detector of detecting the output of the S/H 123 as the amount of return light from the space (non-mark) areas of the optical disk 101 during recording.

Numeral 126 designates a B/A calculation circuit of calculating a B/A value used as a parameter required for the R-OPC operation from the output of the MP detector 124 and the output of the SP detector 125. Numeral 127 designates a CPU of calculating the correction amount of the peak power on the basis of the output of the B/A calculation circuit 126 and of issuing a target peak power command to the peak power control circuit 114.

In accordance with the configuration described above, the operation of carrying out laser power control in combination with ARC and R-OPC will be described below by using the detection signal waveforms for APC and the detection signal waveforms for R-OPC shown in FIG. 8.

In the case when the record data shown in FIG. 8(a) is converted into a multi-pulse train with pulses having different widths shown in FIG. 8(b) and when the laser diode 103 is controlled by predetermined peak power and predetermined bias power, first, as the APC operation, the light emission waveform shown in FIG. 8(c) is detected by the light amount monitoring photodetector 106, the output of the trailing end of the multi-pulse train becomes the mp level shown in FIG. 8(d) by the LPF 108, and mp is sampled and held by the S/H 110 and detected by the mp detector 112 as average power formed of the pulse width ratio of the multi-pulse train and converted from the pulse width ratio of the multi-pulse train, whereby the peak power is detected.

Furthermore, the sp level shown in FIGS. 8(c) and 8(d) is amplified by the AMP 109 and then sampled and held by the S/H 111 and detected by the sp detector 113 as bias power. The peak power control circuit 114 and the bias power control circuit 115 control the laser power so that the peak power and the bias power obtained from mp and sp become predetermined values.

Next, the R-OPC operation will be described. Although the control is carried out on the basis of the predetermined power values by the APC operation, an optimum recording power value differs depending on recording areas and recording states owing to variations in recording sensitivity because of differences in recording areas on the recording face of the optical disk 101. Hence, in addition to the APC operation, another power control operation is required to be carried out so that the optimum recording power is obtained in the states wherein recording is performed.

This power control operation is R-OPC, and the correction amount of the power is calculated while the return light during recording is detected. FIG. 8(e) shows the waveform of return light during recording, generated from the return light detecting photodetectors 117, the I/V conversion circuits 118 and the RF adder 119.

"A" in FIG. 8(e) designates the maximum level of the return light in a state wherein no mark is formed in the mark areas of the recording face of the optical disk 101 during light emission at the peak power, and "B" designates the maximum level of the return light in a mark forming state during light emission at the peak power. "A" is substantially proportional to the reflectivity of the non-recording areas of the optical disk 101 and the peak power, and "B" is based on the relationship between the reflectivity being different depending on the forming state of the recording marks of the optical disk 101 and the peak power. The value (B/A) obtained by dividing B by A is detected, and the peak power is controlled so that a predetermined B/A value is obtained.

However, as the pulse width of the multi-pulse train becomes shorter, it is difficult to directly detect the A and B values; just like the APC operation, as shown in FIG. 8(f), the output of the trailing end of the multi-pulse train becomes an MP level by the LPF 120, and MP is sampled and held by the S/H 122 and detected by the MP detector 124 as an average return light amount formed of the pulse width ratio of the multi-pulse train and converted from the pulse width ratio of the multi-pulse train, whereby the B value shown in FIG. 8(e) is detected.

Furthermore, the SP level shown in FIGS. 8(e) and 8(f) is amplified by the AMP 121 and then sampled and held by the S/H 123 and detected by the SP detector 125 as the amount of return light at the bias power, and the A value is detected from the ratio between the peak power and the bias power. After the B/A value is calculated, it is compared with the predetermined B/A value at the optimum recording power supplied to the optical disk 101, a peak power correction amount of obtaining the above-mentioned predetermined B/A value is obtained by the CPU 127, and the correction of the peak power is commanded to the peak power control circuit 114, whereby proper power control is carried out. FIG. 8(g) shows examples of recording marks recorded by the laser power controlled by the above-mentioned APC and R-OPC operations.

As a result, even when the recording sensitivity varies depending on the difference in the recording areas of the recording face of the optical disk 101, the mark forming state during recording can always be judged by using the return light and the B/A value, whereby it is possible to control the laser power so that an optimum recording state can be attained.

However, when stresses, such as defocusing, off-tracking and tilting, are changed during recording, not only the optimum recording power is changed, but also the detection of the return light amount is affected, and the B/A value used as the control target value of R-OPC is changed with respect to the optimum recording power supplied to the optical disk.

FIG. 9 shows an example of the relationship of the change of the optimum B/A value depending on the change of stress. This relationship is discovered by the inventors. FIG. 9 shows the dependence of the B/A value for the recording power on radial tilting indicating tilting in the radial direction of the disk, and shows that the B/A value for the optimum recording power increases as radial tilting increases.

The recording peak power control operation by R-OPC will be described by using FIG. 14 showing the dependence of the R-OPC detection signal on power. ① in FIG. 14 designates a point that indicates the optimum recording power Po and the R-OPC detection signal B/Ai at Po in a characteristic curve A indicating the relationship between the power and B/A immediately before or after recording, and B/Ai is a control target value of R-OPC during recording. ② designates a point that indicates the optimum recording power Po at the time of the characteristic curve A and the R-OPC detection signal B/An1 on a characteristic curve B in the case when the change of the stress is not caused but only the variation of the disk sensitivity is caused. ②' designates a point that indicates the true optimum recording power P1 and the R-OPC detection signal B/Ai at P1 in the characteristic curve B, and the B/Ai is the same B/A value as that of ① of the characteristic curve A. ③ designates a point that indicates the optimum recording power Po at the time of the characteristic curve A and the R-OPC detection signal B/An2 in a characteristic curve C in the case when tilting, one of the stresses, is caused significantly. ③' designates a point that indicates the true optimum recording power P2' and the R-OPC detection signal B/Ai' at P2' in the characteristic curve C. ③" designates a point that indicates recording peak power P2 for B/Ai at ① and ②' in the characteristic curve C. In the R-OPC operation in the characteristic curve B wherein the change of stress is not caused, since the R-OPC detection signal B/An1 at the power Po during recording is deviated from the control target value B/Ai, recording is continued while the power is changed to the power P1 obtained by adding a correction amount Pc1 to Po so that convergence is performed to the control target value. Since P1 is the optimum recording power value, the quality of recording is maintained.

Next, in the R-OPC operation in the characteristic curve C wherein tilting, one of the stresses, is caused significantly, since the R-OPC detection signal B/An2 at the power Po during recording is deviated from the control target value B/Ai, recording is continued while the power is changed to the power P2 obtained by adding a correction amount Pc2 to Po so that convergence is performed to the control target value. Since P2 is larger than the optimum recording power value P2', the quality of recording is not maintained.

In other words, when power control is carried out with the B/A value used as the R-OPC control target value fixed at a constant value, control is carried out by using power excessively larger than the optimum recording power.

As a result, stable recording becomes difficult, and data reproduction after recording is affected significantly.

DISCLOSURE OF THE INVENTION

Accordingly, in consideration of the above-mentioned problems, the present invention is intended to provide an information recording method and an information recording apparatus capable of recording on an optical disk at optimum recording power, even when stresses, such as defocusing, off-tracking and tilting, are changed during recording.

To solve the above problems, a first aspect of the present invention is an information recording method of recording information, in which laser light is applied to a recording medium while depending on predetermined information said laser light is modulated and the intensity of said light is controlled to form recording mark areas at which reflectivity of said recording medium changes, depending on the intensity of said applied light, wherein before starting data recording, said light is applied to said recording medium at predetermined light intensity, reflection light from said recording mark areas of said recording medium is received, the amount of said reflection light is detected, and a light intensity controlling reference value is calculated on the basis of the amount of said detected light, and during data recording, reflection light from said recording mark areas of said recording medium is received, the amount of said reflection light is detected, and a light intensity controlling detection value is calculated on the basis of the amount of said detected light, corrected light intensity is obtained from the difference between said light controlling intensity reference value and said light intensity controlling detection value, said light intensity controlling reference value is corrected depending on said corrected light intensity, and the intensity of said laser light is controlled so that said corrected light intensity controlling reference value substantially coincides with said light intensity controlling detection value.

Further, a second aspect of the present invention is an information recording method, wherein said light intensity controlling reference value to be used for calculating said corrected light intensity is renewed to said corrected light intensity controlling reference value.

Further, a third aspect of the present invention is an information recording method of recording information, in which laser light is applied to a recording medium on which light intensity suited for mark formation changes owing to the change of the wavelength of said laser light depending on temperature change while depending on predetermined information said laser light is modulated and the intensity of said light is controlled to form recording mark areas at which reflectivity of said recording medium changes, depending on the intensity of said applied light, wherein before starting data recording, said light is applied to said recording medium at predetermined light intensity, reflection light from said recording mark areas of said recording medium is received, the amount of said reflection light is detected and laser vicinity temperature is detected simultaneously, a light intensity controlling reference value is calculated on the basis of the amount of said detected light, and the detected temperature is memorized as a reference temperature, and during data recording, reflection light from said recording mark areas of said recording medium is received, the amount of said reflection light is detected, a light intensity controlling detection value is calculated on the basis of the amount of said detected light and laser vicinity temperature is detected simultaneously, first corrected light intensity is obtained from the difference between said light controlling intensity reference value and said light intensity controlling detection value, second corrected light intensity is obtained from the difference between said detected temperature and said reference temperature, light intensity obtained by subtracting said second corrected light intensity from said first corrected light intensity is obtained as temperature corrected light intensity, said light intensity controlling reference value is corrected depending on said temperature corrected light intensity, and the intensity of said laser light is controlled so that said corrected light intensity controlling reference value substantially coincides with said light intensity controlling detection value.

Further, a fourth aspect of the present invention is an information recording method in accordance with the third aspect of the present invention, wherein said light intensity controlling reference value to be used for calculating said temperature corrected light intensity is renewed to said corrected light intensity controlling reference value.

Further, a fifth aspect of the present invention is an information recording method in accordance with the first or the third aspect of the present invention, wherein calculation of said light intensity controlling reference value and said light intensity controlling detection value is carried out by detecting the average output of the amount of the reflection light at said recording mark areas after a predetermined time based on a laser light modulation signal has passed, by obtaining the maximum value of the amount of the reflection light at said recording mark areas from the detection value, by calculating the maximum value of the amount of the reflection light at the peak value of the light intensity having been set on the basis of the detection result of the amount of the reflection light at areas, other than recording mark areas, irradiated with light at light intensity not contributing to recording mark formation, and by dividing the maximum value of the amount of the reflection light in said recording mark areas by the calculated maximum value of the amount of the reflection light at the peak value of the light intensity.

Further, a sixth aspect of the present invention is an information recording method in accordance with the first or the third aspect of the present invention, wherein a corrected light intensity correction table indicating the relationship of a reference value correction amount with respect to said corrected light intensity in each type of recording medium is memorized in advance, and said light intensity controlling reference value depending on said corrected light intensity is corrected on the basis of said corrected light intensity correction table after discrimination of the type of the recording medium.

Further, a seventh aspect of the present invention is an information recording method in accordance with the third aspect of the present invention, wherein a light intensity temperature correction table indicating the relationship of the change amount of the light intensity suited for mark formation with respect to temperature in each type of recording medium is memorized in advance, and said second corrected light intensity is obtained on the basis of the difference between said detected temperature and said reference temperature and said light intensity temperature correction table.

Further, an eighth aspect of the present invention is an information recording method of recording information, in which laser light is applied to a recording medium while depending on predetermined information said laser light is modulated and the intensity of said light is controlled to form recording mark areas at which reflectivity of said recording medium changes depending on the intensity of said applied light, wherein before starting data recording, said light is applied to said recording medium at predetermined light intensity, reflection light from said recording mark areas of said recording medium is received, the amount of said reflection light is detected, and a light intensity controlling reference value is calculated on the basis of the amount of the detected light, and during data recording, reflection light from said recording mark areas of said recording medium is received, the amount of said reflection light is detected, a light intensity controlling detection value is calculated on the basis of the amount of said detected light and a stress affecting recording or reproduction on said recording medium as the change of light intensity simultaneously, said light intensity controlling reference value is corrected depending on said stress, and the intensity of said laser light is controlled so that said corrected light intensity controlling reference value substantially coincides with said light intensity controlling detection value.

Further, a ninth aspect of the present invention is an information recording method in accordance with the eighth aspect of the present invention, wherein a stress correction table indicating the relationship of a reference value correction amount with respect to said stress in each type of recording medium is memorized in advance, and said light intensity controlling reference value depending on said stress is corrected on the basis of said stress correction table after discrimination of the type of the recording medium.

Further, a tenth aspect of the present invention is an information recording apparatus of recording information, in which laser light is applied to a recording medium while depending on predetermined information said laser light is modulated and the intensity of said light is controlled to form recording mark areas at which reflectivity of said recording medium changes, depending on the intensity of said applied light, comprising:

outgoing light amount controlling means of detecting the amount of outgoing laser light and of controlling the amount of the outgoing laser light so as to obtain a predetermined power value, reflection light amount detecting means of receiving reflection light from the recording mark areas of said recording medium and of detecting the amount of the reflection light, light intensity controlling detection signal generating means of generating a light intensity controlling detection signal on the basis of the amount of the detected light of said reflection light amount detecting means, reference value generating means of applying light in advance to said recording medium at predetermined light intensity before starting data recording and of generating a light intensity controlling reference value from said light intensity controlling detection signal, light intensity controlling detection value generating means of generating a light intensity controlling detection value from said light intensity controlling detection signal during data recording, switching means of switching the output of said light intensity controlling detection signal to said reference value generating means or said light intensity controlling detection value generating means, reference value correcting means of obtaining corrected light intensity from the difference between said reference value and said light intensity controlling detection value and of correcting said reference value depending on said corrected light intensity, and corrected power value generating means of generating a corrected power value from the difference between said reference value corrected by said reference value correcting means and said light intensity controlling detection value and of outputting said corrected power value to said outgoing light amount controlling means.

Further, an eleventh aspect of the present invention is an information recording apparatus of recording information, in which laser light is applied to a recording medium on which light intensity suited for mark formation changes owing to the change of the wavelength of said laser light depending on temperature change while said laser light is modulated and the intensity of said light is controlled depending on predetermined information to form recording mark areas at which the reflectivity of said recording medium changes depending on the intensity of said applied light, comprising:

outgoing light amount controlling means of detecting the amount of outgoing laser light and of controlling the amount of the outgoing laser light so as to obtain a predetermined power value, reflection light amount detecting means of receiving reflection light from the recording mark areas of said recording medium and of detecting the amount of the reflection light, light intensity controlling detection signal generating means of generating a light intensity controlling detection signal on the basis of the amount of the detected light of said reflection light amount detecting means, temperature detecting mans of detecting laser vicinity temperature, reference value generating means of applying light in advance to said recording medium at predetermined light intensity before starting data recording and of generating light intensity controlling reference value from said light intensity controlling detection signal, reference temperature memorizing means of memorizing the result of detection after the laser vicinity temperature at the time of the generation of said reference value is detected by said temperature detecting means, light intensity controlling detection value generating means of generating a light intensity controlling detection value from said light intensity controlling detection signal during data recording, detected temperature memorizing means of memorizing the result of detection after the laser vicinity temperature at the time of the generation of said light intensity controlling detection value is detected by said temperature detecting means, switching means of switching the output of said light intensity controlling detection signal to said reference value generating means or said light intensity controlling detection value generating means, first corrected light intensity generating means of calculating first corrected light intensity from the difference between said reference value and said light intensity controlling detection value, second corrected light intensity generating means of calculating second corrected light intensity from the difference between said detected temperature and said reference temperature, temperature corrected light intensity generating means of generating temperature corrected light intensity by subtracting said second corrected light intensity from said first corrected light intensity, reference value correcting means of correcting said reference value depending on said temperature corrected light intensity, and corrected power value generating means of generating a corrected power value from the difference between said reference value corrected by said reference value correcting means and said light intensity controlling detection value and of outputting said corrected power value to said outgoing light amount controlling means.

Further, a twelfth aspect of the present invention us an information recording apparatus in accordance with the tenth or the eleventh aspect of the present invention wherein said light intensity controlling detection signal generating means comprises:

a low-pass filter of averaging the output of said reflection light amount detecting means, a sample-and-hold circuit of detecting the output of said low-pass filter after a predetermined time based on a laser light modulation signal, mark area reflection light amount maximum value generating means of obtaining the maximum value of the amount of reflection light at recording mark areas from a value detected by said sample-and-hold circuit and the duty ratio of outgoing power contributing to mark formation, peak power reflection light amount maximum value generating means of calculating the peak amount of reflection light at the peak value of light intensity having been set on the basis of the result of the detection of the amount of reflection light at areas, other than the recording mark areas, irradiated with light at light intensity not contributing to recording mark formation, and a division circuit of dividing said maximum value of the amount of reflection light at said recording mark areas by the maximum value of the peak power amount of reflection light and of generating a light intensity controlling detection signal.

A thirteenth aspect of the present invention is an information recording apparatus in accordance with the tenth or the eleventh aspect of the present invention, comprising recording medium type discrimination means and means of memorizing corrected light intensity correction table indicating the relationship of the correction amount of said reference value with respect to said corrected light intensity in each type of recording medium in advance.

A fourteenth aspect of the present invention is an information recording apparatus in accordance with the tenth or the eleventh aspect of the present invention, comprising recording medium type discrimination means and means of memorizing light intensity temperature correction table indicating the relationship of the change amount of light intensity suited for mark formation with respect to temperature in each type of recording medium in advance.

A fifteenth aspect of the present invention is an information recording apparatus of recording information, in which laser light is applied to a recording medium while depending on predetermined information said laser light is modulated and the intensity of said light is controlled to form recording mark areas at which reflectivity of said recording medium changes, depending on the intensity of said applied light, comprising:

outgoing light amount controlling means of detecting the amount of outgoing laser light and of controlling the amount of the outgoing laser light so as to obtain a predetermined power value, reflection light amount detecting means of receiving reflection light from the recording mark areas of said recording medium and of detecting the amount of the reflection light, light intensity controlling detection signal generating means of generating a light intensity controlling detection signal on the basis of the amount of the detected light of said reflection light amount detecting means, reference value generating means of applying light in advance to said recording medium at predetermined light intensity before starting data recording and of generating a light intensity controlling reference value from said light intensity controlling detection signal, light intensity controlling detection value generating means of generating a light intensity controlling detection value from said light intensity controlling detection signal during data recording, switching means of switching the output of said light intensity controlling detection signal to said reference value generating means or said light intensity controlling detection value generating means, stress detecting means of detecting stress affecting recording or reproduction on said recording medium as the change of light intensity, reference value correcting means of correcting said light intensity controlling reference value depending on said stress, corrected power value generating means of generating a corrected power value from the difference between said reference value corrected by said reference value correcting means and said light intensity controlling detection value and of outputting said corrected power value to said outgoing light amount controlling means.

A sixteenth aspect of the present invention is an information recording apparatus in accordance with the fifteenth aspect of the present invention, comprising recording medium type discrimination means and means of memorizing stress correction table indicating the relationship of the correction amount of said reference value with respect to said stress in each type of recording medium in advance.

BRIEF DESCRIPTION OF THE DRAWINGS

FIG. 13 is a flowchart showing the operation of the fourth embodiment of the present invention;

FIG. 18 is a table showing corrected light intensity correction and light intensity temperature correction.

Figure 1:
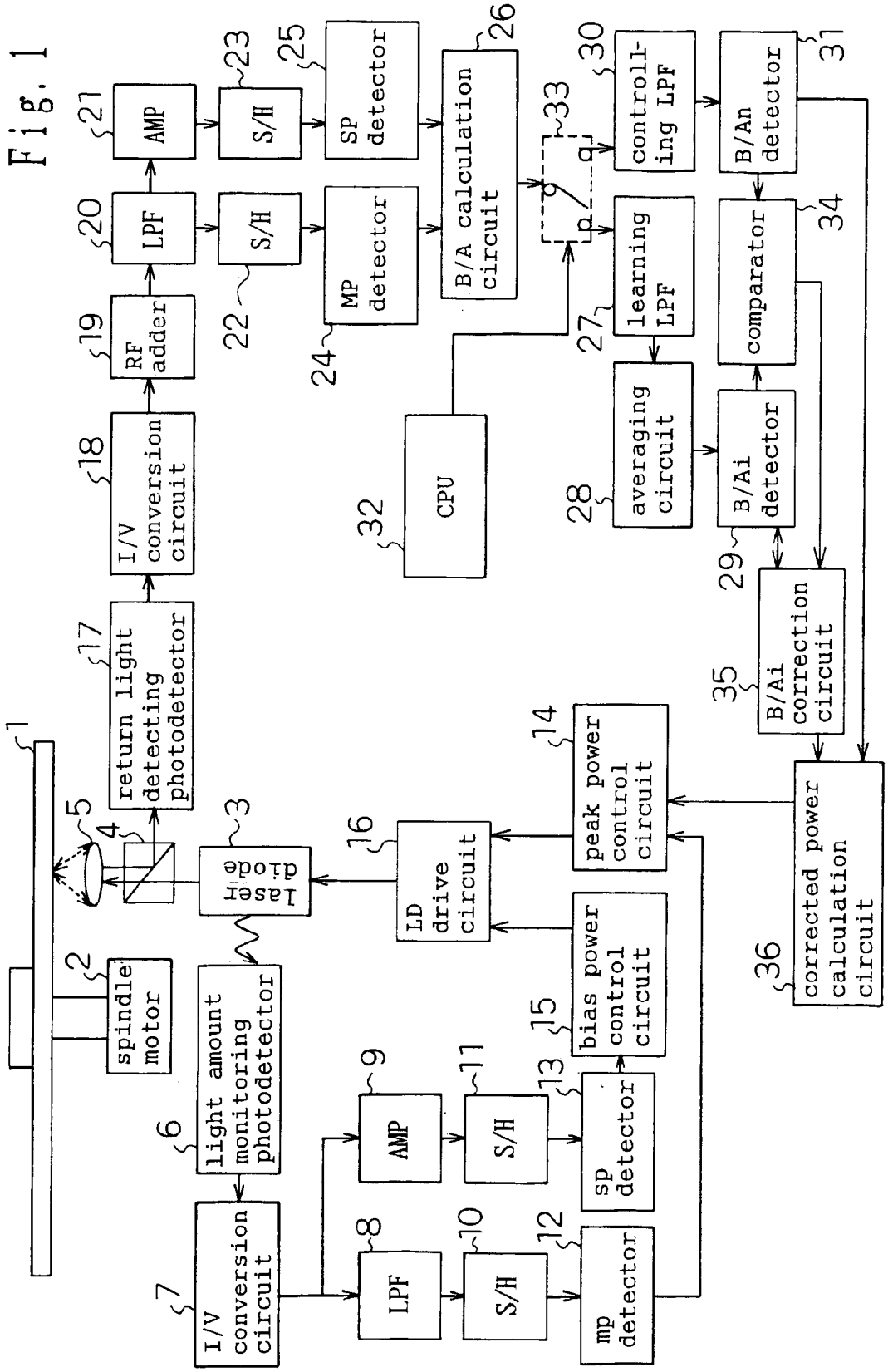
FIG. 1 is a block diagram showing the configuration of an information recording apparatus in accordance with a first embodiment of the present invention.

EXPLANATION OF NUMERALS 1 optical disk
2 spindle motor
3 laser diode
4 beam splitter
5 objective lens
6 light amount monitoring photodetector
7 I/V conversion circuit
8 LPF
9 AMP
10, 11 S/H
12 mp detector
13 sp detector
14 peak power control circuit
15 bias power control circuit
16 LD drive circuit
17 return light detecting photodetector
18 I/V conversion circuit
19 RF adder
20 LPF
21 AMP
22, 23 S/H
24 MP detector
25 SP detector
26 B/A calculation circuit
27 learning LPF
28 averaging circuit
29 (B/A)i detector
30 controlling LPF
31 (B/A)n detector
32 38, 40, 42, 127 CPU
33 switch
34 comparator
35 (B/A)i correction circuit
36 corrected power calculation circuit
37 temperature change detector
39 disk type discrimination circuit
41 stress detector
101 optical disk
102 spindle motor
103 laser diode
104 beam splitter
105 objective lens
106 light amount monitoring photodetector
107 I/V conversion circuit
108 LPF
109 AMP
110, 11 S/H
112 mp detector
113 sp detector
114 peak power control circuit
115 bias power control circuit
116 LD drive circuit
117 return light detecting photodetector
118 I/V conversion circuit
119 RF adder
120 LPF
121 AMP
122, 123 S/H
124 MP detector
125 SP detector
126 B/A calculation circuit

THE BEST MODE FOR CARRYING OUT THE INVENTION

Embodiments in accordance with the present invention will be described below referring to the drawings.

The same components in the embodiments are designated by the same numerals.

(First Embodiment)

First, a first embodiment will be described.

Figure 10:
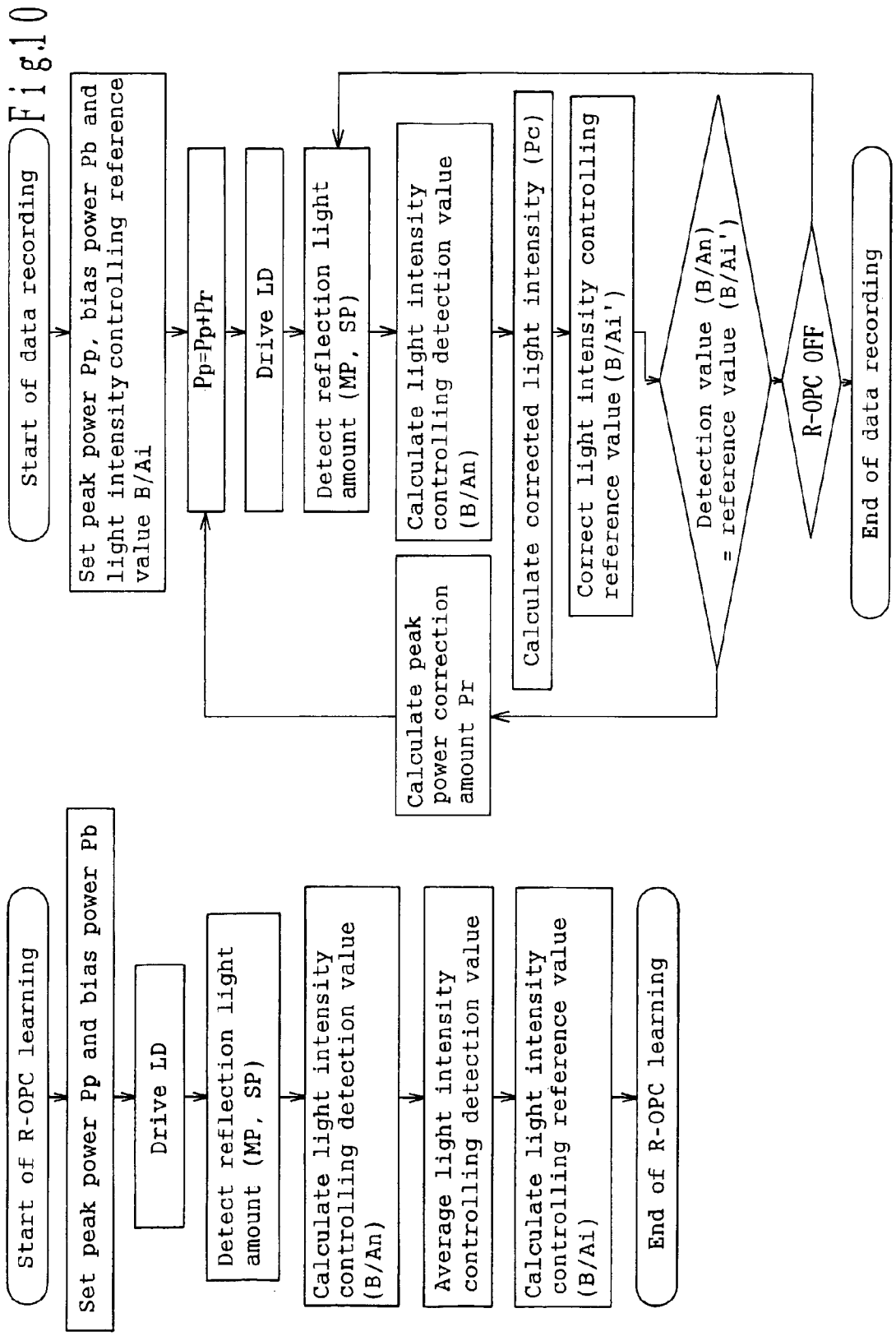
FIG. 10 is a flowchart showing the operation of the first embodiment of the present invention.

FIG. 1 is a block diagram showing the configuration of an information recording apparatus in accordance with this embodiment. FIG. 10 is a flowchart showing the operation of this embodiment.

The information recording method and information recording apparatus in accordance with this embodiment will be described by using FIG. 1 and FIG. 10.

Numeral 1 designates an optical disk capable of recording and reproducing information. Numeral 2 designates a spindle motor of rotating the optical disk 1. Numeral 3 designates a laser diode capable of emitting light by using a multi-pulse train with pulses having different widths for mark areas during recording on the optical disk 1. Numeral 4 designates a beam splitter of separating the outgoing light of the laser diode 3 and the return light from the optical disk 1. Numeral 5 designates an objective lens of gathering laser light in recordable or reproducible areas of the optical disk 1.

Numeral 6 designates a light amount monitoring photodetector of detecting part of the outgoing light emitted from the laser diode 3. Numeral 7 designates an I/V conversion circuit of converting the current output of the light amount monitoring photodetector 6 into a voltage.

Numeral 8 designates a low-pass filter (LPF) of attenuating the frequency band of the output of the I/V conversion circuit 7. Numeral 9 designates a voltage amplifier (AMP) of amplifying the current output of the light amount monitoring photodetector 6. Numeral 10 designates a sample-and-hold circuit (S/H) of sampling and holding the output of the LPF 8 at predetermined timing. Numeral 11 designates a sample-and-hold circuit (S/H) of sampling and holding the output of the AMP 9 at predetermined timing. Numeral 12 designates an mp detector of detecting the output of the S/H 10 as the average power of recording light emission for a multi-pulse train.

Numeral 13 designates an sp detector of detecting the output of the S/H 11 as the bias power of recording light emission for a multi-pulse train. Numeral 14 designates a peak power control circuit of controlling the peak power of the recording light emission for a multi-pulse train. Numeral 15 designates a bias power control circuit of controlling the bias power of the recording light emission for a multi-pulse train. Numeral 16 designates an LD drive circuit of driving the laser diode 3 to emit light by using power and a multi-pulse train with pulses having different widths controlled by the peak power control circuit 14 and the bias power control circuit 15.

Numerals 6 to 13 designate examples of outgoing light amount controlling means of detecting the amount of the outgoing laser light and of controlling the amount of the outgoing laser light to obtain a predetermined power value.

Numeral 17 designates a plurality of return light detecting photodetectors of detecting return light from the optical disk 1. Numeral 18 designates a plurality of I/V conversion circuits of converting each of the current outputs of the plurality of return light detecting photodetectors 17 into a voltage.

Numeral 19 designates an RF adder of adding the outputs of the plurality of I/V conversion circuits 18. Numerals 17 to 19 designate examples of reflection light amount detecting means of receiving reflection light from the recording mark areas of a recording medium and of detecting the amount of the reflection light.

Numeral 20 designates a low-pass filter (LPF) of attenuating the frequency band of the output of the RF adder 19. Numeral 21 designates a voltage amplifier (AMP) of amplifying the output of the LPF 20. Numeral 22 designates a sample-and-hold circuit (S/H) of sampling and holding the output of the LPF 20 at predetermined timing. Numeral 23 designates a sample-and-hold circuit (S/H) of sampling and holding the output of the AMP 21 at predetermined timing.

Numeral 24 designates an MP detector of detecting the output of the S/H 22 as the average amount of return light from the mark areas of the optical disk 1 during recording.

Numeral 25 designates an SP detector of detecting the output of the S/H 23 as the amount of return light from the space (non-mark) areas of the optical disk 1 during recording.

Numeral 26 designates a B/A calculation circuit of calculating a B/A value used as a parameter required for the R-OPC operation from the output of the MP detector 24 and the output of the SP detector 25.

Numerals 20 to 26 designate light intensity controlling detection signal generating means of generating a light intensity controlling detection signal on the basis of the amount of the detection light of the above-mentioned reflection light amount detecting means.

Numeral 27 designates a learning LPF used as a low-pass filter of attenuating the frequency band of the output of the B/A calculation circuit 26.

Numeral 28 designates an averaging circuit of averaging the variations of the output of the learning LPF 27. Numeral 29 designates a (B/A)i detector of detecting the B/A value averaged by the averaging circuit 28 as a reference value used as an R-OPC control target and of holding the value. Numerals 27 to 29 designate reference value generating means of applying light to the recording medium at predetermined light intensity in advance before the start of data recording and of generating a light intensity controlling reference value from the above-mentioned light intensity controlling detection signal.

Numeral 30 designates a controlling LPF used as a low-pass filter of attenuating the frequency band of the output of the B/A calculation circuit 26.

Numeral 31 designates a (B/A)n detector of detecting the B/A value of carrying out R-OPC control from the output of the controlling LPF 30.

Numerals 30 to 31 designate light intensity controlling detection value generating means of generating the light intensity controlling detection value from the above-mentioned light intensity controlling detection signal at the time of data recording.

Numeral 33 designates a switch of performing switching so that the output of the B/A calculation circuit 26 is input to the learning LPF 27 or the controlling LPF 30.

Numeral 32 designates a CPU of commanding the switch 33 to carry out switching from the output of the B/A calculation circuit 26 to the learning LPF 27 when generating the reference value used as the R-OPC control target or to the controlling LPF 30 when generating the controlling detection value during data recording. Numerals 32 to 33 designate switching means of selectively outputting the above-mentioned light intensity controlling detection signal to the above-mentioned reference value generating means and light intensity controlling detection signal generating means.

Numeral 34 designates a comparator of comparing the output of the (B/A)i detector 29 and the output of the (B/A)n detector 31 and of outputting the difference.

Numeral 35 designates a (B/A)i correction circuit of correcting the reference value obtained by the (B/A)i detector 29 on the basis of the difference output of the comparator 34.

Numerals 34 to 35 designate reference value correction means of obtaining corrected light intensity from the difference between the above-mentioned reference value and light intensity controlling detection value and of correcting the above-mentioned reference value depending on the above-mentioned corrected light intensity.

Numeral 36 designates a corrected power calculation circuit of calculating corrected power from the reference value used as the R-OPC control target value corrected by the (B/A)i correction circuit 35 and from the output of the (B/A)n detector 31 and of commanding the peak power control circuit 14 to change the peak power target value, and this circuit is corrected power value generating means of generating a corrected power value from the difference between the reference value corrected by the above-mentioned reference value correcting means and the above-mentioned light intensity controlling detection value and of outputting the corrected power value to the above-mentioned outgoing light amount controlling means.

Next, the operation of this embodiment will be described.

First, the APC operation of detecting the amount of outgoing laser light and of controlling the laser diode 3 by using the predetermined peak power and the predetermined bias power for multi-pulse train data with pulses having different widths is the same as the contents described in the prior art, and thus explained in brief.

The laser light emission output detected by the light amount monitoring photodetector 6 is detected by the LPF 8, the S/H 10 and the mp detector 12 by using the output of the trailing end of the multi-pulse train of the light emission waveform as an mp level, the average power formed of the pulse width ratio of the multi-pulse train is detected, and the peak power is detected by carrying out conversion from the pulse width ratio of the multi-pulse train. In addition, the sp level and the bias power are detected by the AMP 9, the S/H 11 and the sp detector 13. Laser power is controlled by the peak power control circuit 14 and the bias power control circuit 15 so that the peak power and the bias power obtained from mp and sp become predetermined values.

Next, the R-OPC operation will be explained.

First, before recording is carried out in the data areas of the optical disk 1, the operation of learning the optimum recording power and of generating the reference value used as the R-OPC control target value of the optimum recording power by using areas other than data areas, for example, the power calibration area, is explained.

In the power calibration area of the disk 1, recording is carried out by the recording power obtained by the power learning. At this time, the return light during recording is detected by the return light detecting photodetectors 17, the I/V conversion circuits 18 and the RF adder 19, the output of the trailing end of the multi-pulse train is detected as the average return light amount MP level formed of the pulse width ratio of the multi-pulse train by the LPF 20, the S/H 22 and the MP detector 24 and amplified by the AMP 21, the return light at the bias power is sampled and held by the S/H 23, and the SP level is detected by the SP detector 25.

With respect to the MP and SP levels detected, in the MP level, the B value is calculated by the B/A calculation circuit 26 by converting the pulse width ratio of the multi-pulse train; in the SP level, the A value is calculated from the ratio between the peak power and the bias power, and the B/A value obtained by dividing B by A is detected. Next, the output of the B/A value is input to the learning LPF 27 by the CPU 32 and the switch 33. Since the above-mentioned B/A value is continuously sampled and held at predetermined timing, for example, when the pulse width of data is 9T or more, the value detected at each time of sampling and holding varies slightly owing to the recording sensitivity in the circumferential direction of the optical disk, the variation of the reflectivity, tilting, etc. Hence, the variation of the above-mentioned detected B/A value is reduced by the learning LPF 27 suited for the recording time required for the generation of the reference value, and averaged by the averaging circuit 28 by dividing the integral value of the sampled and held values by the number of sampling and holding times; then the (B/A)i used as the initial value of the R-OPC control target value is calculated by the (B/A)i detector 29 and determined as a reference value.

Next, recording in the data areas will be explained.

Even when data recording is carried out, the B/A calibration circuit 26 detects the B/A value from the return light during recording just as described above. The CPU 32 and the switch 33 carry out switching to input the output of the B/A calibration circuit 26 to the controlling LPF 30. The controlling LPF is set at a frequency band best suited for the time at which the R-OPC operation is desired to be followed. The (B/A)n value during data recording is detected by the controlling LPF 30 and the (B/A)n detector 31. The difference between the initial reference value (B/A)i and the detection value (B/A)n is detected by the comparator 34, and the difference information is output to the (B/A)i correction circuit 35.

The (B/A)i correction circuit 35 carries out power conversion on the basis of the difference information of the B/A value and calculate corrected light intensity Pc; in the case when the corrected light intensity Pc obtained by power conversion is not less than a predetermined power value, for example, a power value not less than the variation of the recording sensitivity of the optical disk 1, or a power value of not less than ±5% of the optimum recording power obtained by power learning in the power calibration area, the (B/A)i correction circuit judges that power correction factors are factors, other than the variation in the sensitivity of the disk, including stresses, such as defocusing, off-tracking and tilting, then corrects the reference value (B/A)i and outputs a corrected reference value (B/A)i' to the corrected power calculation circuit 36.

Figure 15:
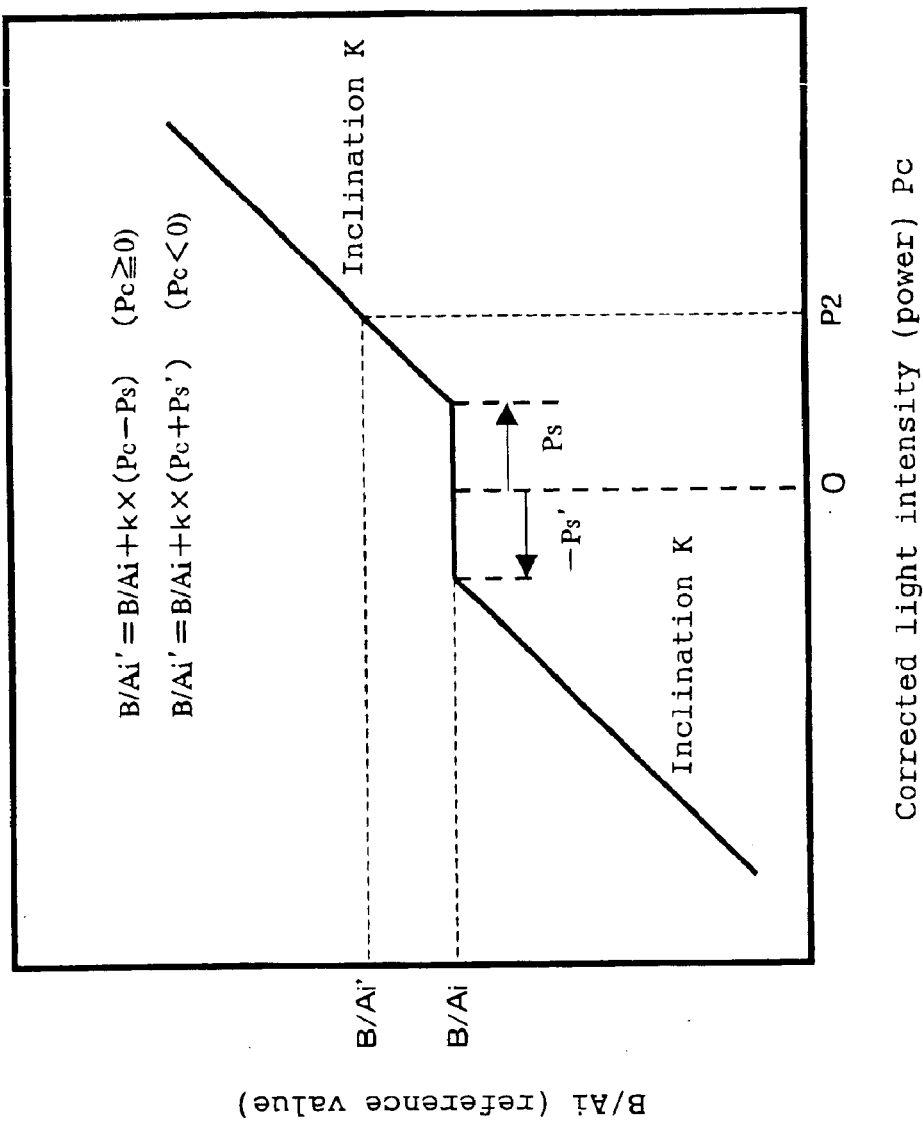
FIG. 15 is a view showing the relationship of a B/Ai reference value with respect to corrected light intensity Pc.

The correction of B/Ai will be described by using drawings. FIG. 15 is a view showing the relationship of the B/Ai reference value with respect to the corrected light intensity Pc. In the figure, Ps and Ps−' indicate the above-mentioned predetermined values; for example, it is assumed that Ps is +5% and −Ps' is −5% with respect to the optimum recording power Po during B/A learning. In the case when the corrected light intensity Pc is Ps or more, or −Ps' or less, a B/Ai change amount with respect to (Pc−Ps) or (Pc+Ps') is obtained by using the inclination k of B/A with respect to Pc, whereby the reference value B/Ai is obtained.

When $Pc \geq 0$, $B/Ai' = B/Ai + k \times (Pc - Ps)$

When $Pc < 0$, $B/Ai' = B/Ai + k \times (Pc + Ps')$ (Equation 1)

Figure 16:
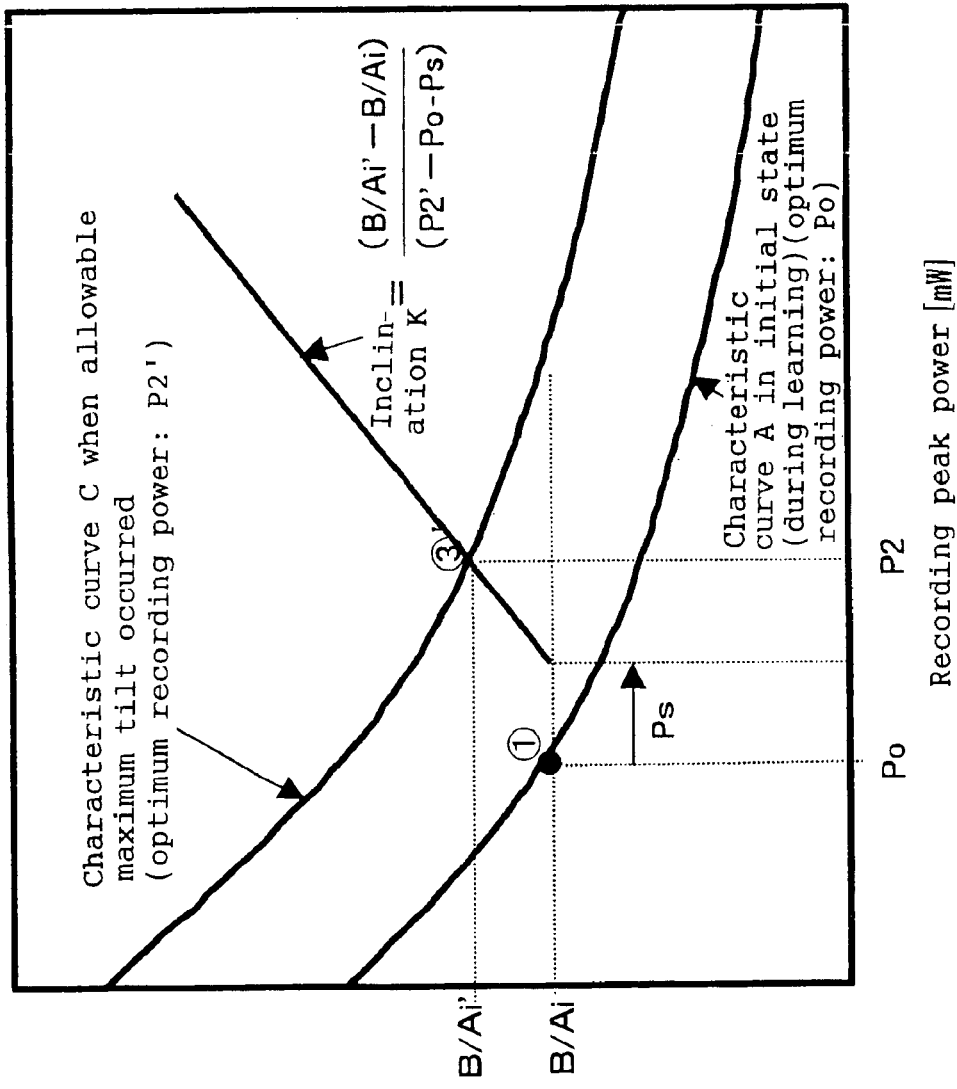
FIG. 16 is a view showing the relationship among recording power, B/A and B/Ai reference value correction coefficient k.

The inclination k is calculated in advance from B/Ai' with respect to the optimum power P2' at the time when the allowable maximum tilt of an apparatus is caused, B/Ai with respect to the optimum power Po at the time when no tilt is caused and the above-mentioned Ps. FIG. 16 shows the relationship among recording power, B/A and B/Ai reference value correction coefficient k.

$k = (B/Ai' - B/Ai)/(P2' - Po - Ps)$ (Equation 2)

The inclination k which shows the relationship between the above-mentioned corrected light intensity Pc and the correction amount of the reference value (B/A)i, and the above-mentioned predetermined power values Ps and −Ps have been stored in the information recording apparatus in advance. In the case when the result obtained by power conversion is the predetermined power value or less, the reference value (B/A)i is not corrected, and the reference value (B/A)i is output as (B/A)i' to the corrected power calculation circuit 36.

From the result of the output of the (B/A)i correction circuit 35 and the output of the (B/A)n detector 31, the corrected power calculation circuit 36 obtains a peak power value Pr to be corrected actually, commands the change of the power target value to the peak power control circuit 14 and controls recording power.

In addition, the corrected reference value (B/A)i' becomes the R-OPC control target value of the (B/A)i detector 29, and (B/A)i used as the control target value is renewed as necessary each time correction is carried out.

As described above, in accordance with this embodiment, even if the B/An value used as the R-OPC detection signal is changed by stress, power overcorrection of the R-OPC operation due to stress change can be prevented by changing B/Ai used as the control target value, and recording can be attained by carrying out stable and highly accurate power control.

(Second Embodiment)

Next, a second embodiment will be described.

Figure 2:
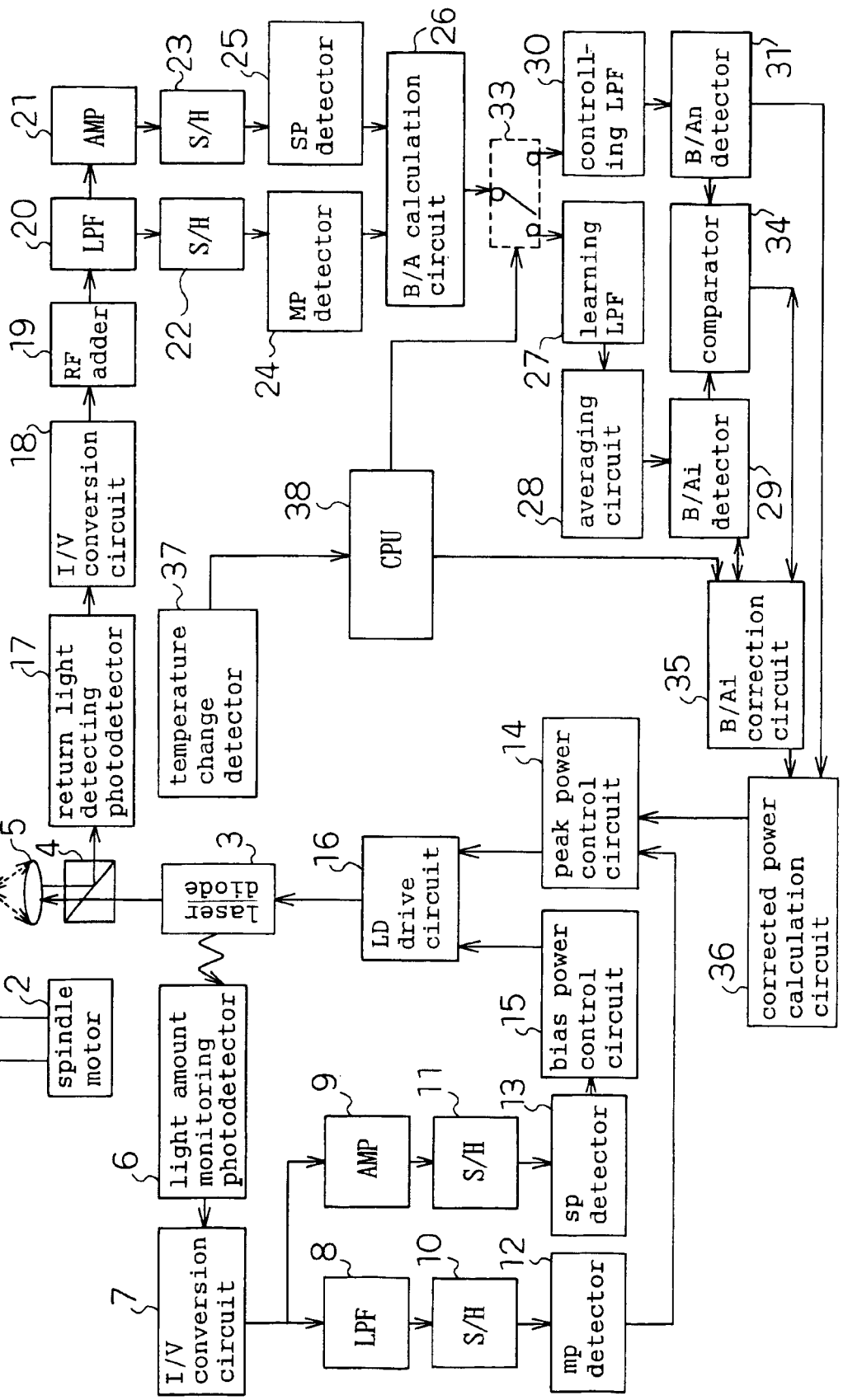
FIG. 2 is a block diagram showing the configuration of an information recording apparatus in accordance with a second embodiment of the present invention.
Figure 11:
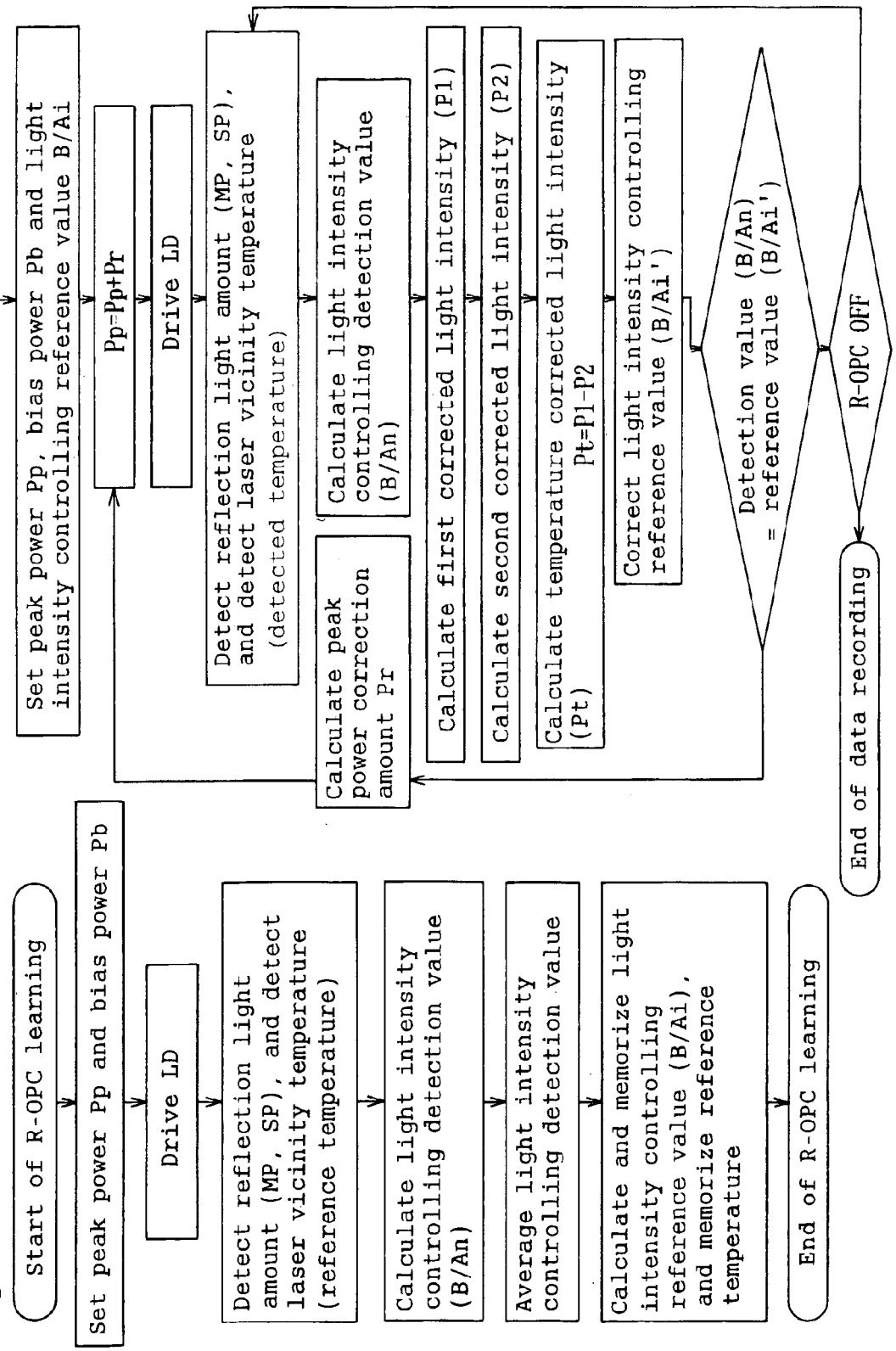
FIG. 11 is a flowchart showing the operation of the second embodiment of the present invention.

FIG. 2 is a block diagram showing the configuration of an information recording apparatus in accordance with this embodiment. FIG. 11 is a flowchart showing the operation of this embodiment.

The information recording method and information recording apparatus in accordance with this embodiment will be described by using FIG. 2 and FIG. 11. However, components similar to those of the first embodiment are not explained.

The information recording method and information recording apparatus in accordance with this embodiment comprises an optical disk 1, a spindle motor 2, a laser diode 3, a beam splitter 4, an objective lens 5, a light amount monitoring photodetector 6, an I/V conversion circuit 7, an LPF 8, an AMP 9, an S/H 10, an S/H 11, an mp detector 12, an sp detector 13, a peak power control circuit 14, a bias power control circuit 15, an LD drive circuit 16, return light detecting photodetectors 17, I/V conversion circuits 18, an RF adder 19, an LPF 20, an AMP 21, an S/H 22, an S/H 23, an MP detector 24, an SP detector 25, a B/A calculation circuit 26, a learning LPF 27, an averaging circuit 28, a (B/A)i detector 29, a controlling LPF 30, a (B/A)n detector 31, a switch 33, a comparator 34, a (B/A)i correction circuit 35, a corrected power calculation circuit 36, a temperature change detector 37 of detecting temperature change, and a CPU 38.

Next, the operation of this embodiment will be described. However, since the contents of the APC operation are similar to those of the first embodiment, the explanation of the APC operation is omitted, and only the portions of the contents of the R-OPC operation, different from the first embodiment, are explained.

Figure 3:
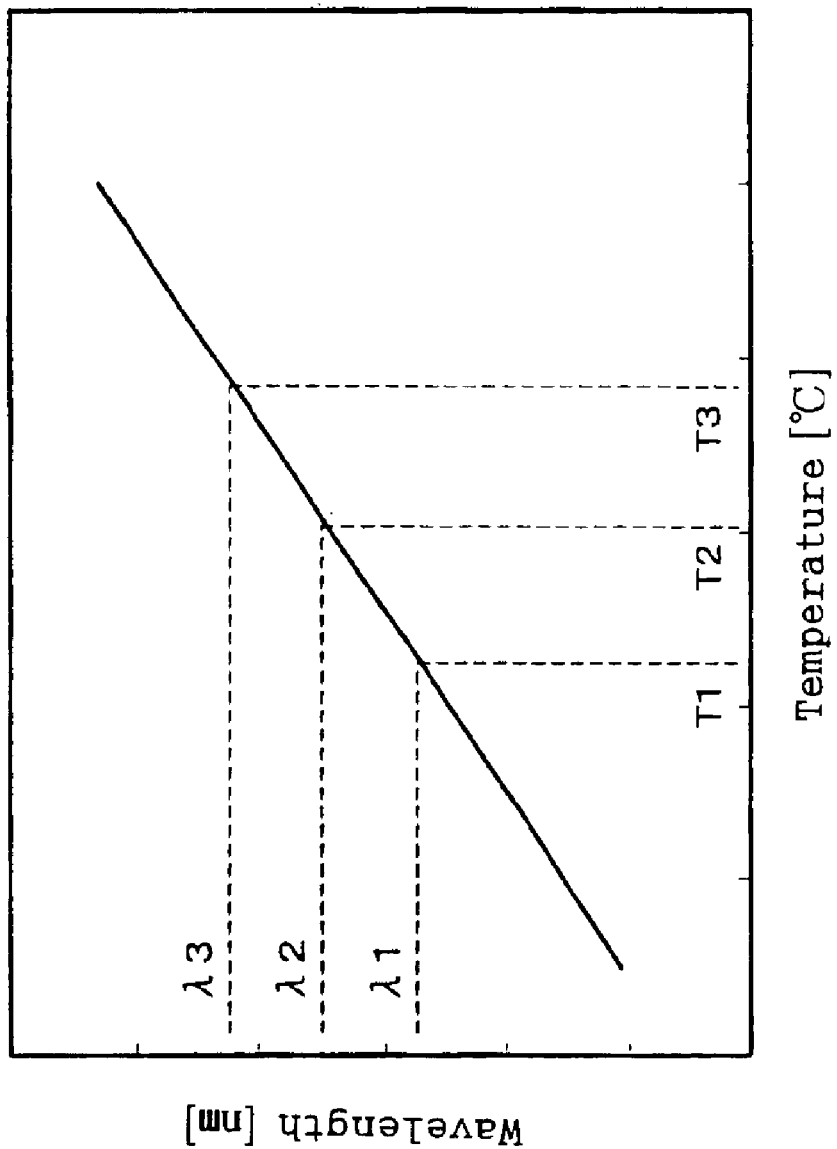
FIG. 3 is a view showing the relationship between temperature and laser waveform.
Figure 4:
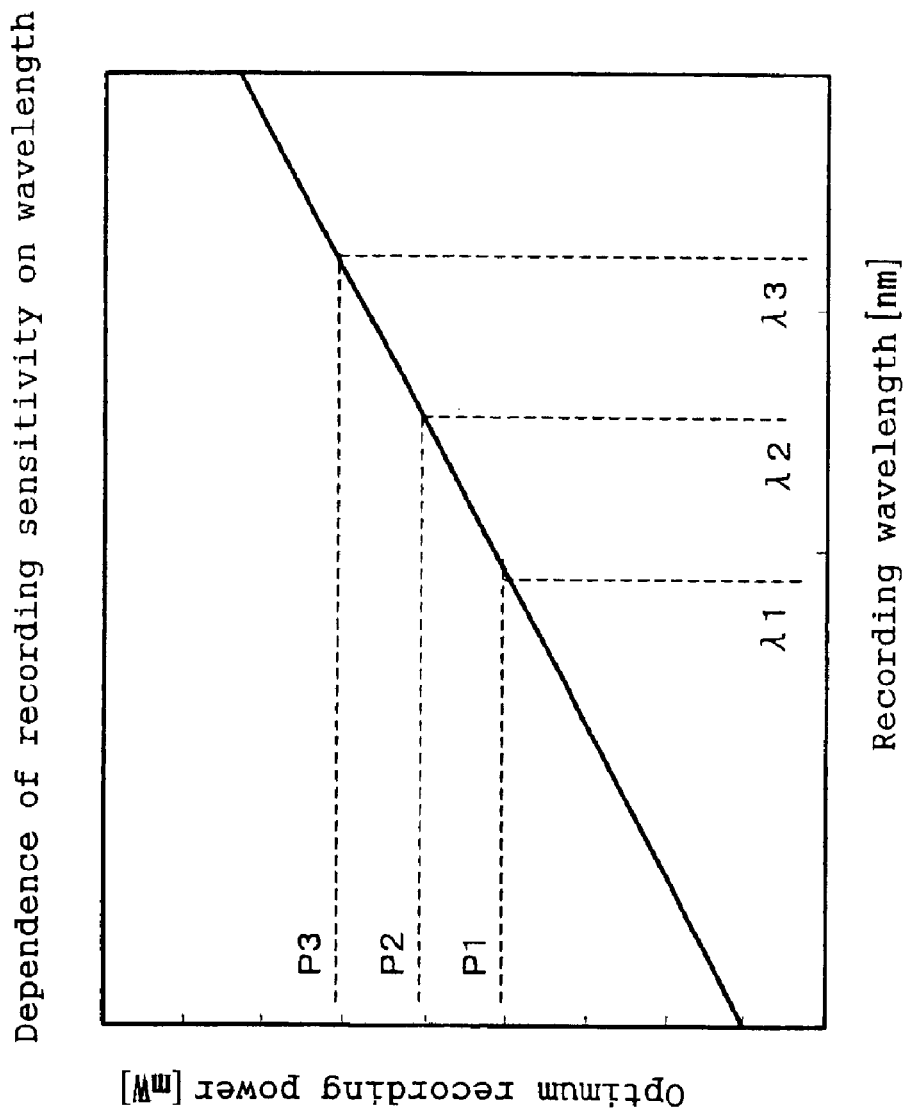
FIG. 4 is a view showing the dependence of the recording sensitivity of an optical disk on waveform.

FIG. 3 shows the relationship between temperature and laser waveform. FIG. 4 shows the dependence of recording sensitivity of an optical disk on waveform.

FIG. 3 shows that the wavelength of the laser diode increases substantially in proportion to temperature rise.

Furthermore, in the case of an optical disk having wavelength dependence, for example, an optical disk having a recording film of dye, FIG. 4 shows that when the recording wavelength increases, the recording sensitivity lowers, and the optimum recording power rises. In other words, when a temperature change occurs, the optimum recording power of the optical disk having wavelength dependence is changed. The R-OPC operation in the case when the optical disk having this wavelength dependence is used will be explained.

In the case when a temperature change is detected by the temperature change detector 37, the CPU 38 obtains the change amount of the optimum recording power with respect to the amount of the above-mentioned temperature change, and outputs the change value of the optimum recording power as a second corrected light intensity P2 to the (B/A)i correction circuit 35.

The (B/A)i correction circuit 35 first carries out power conversion on the basis of the difference information of the B/A value and obtains a first corrected light intensity P1, then subtracts the above-mentioned corrected light intensity P2 from the first corrected light intensity P1 thereby to obtain the result of the subtraction as a temperature corrected light intensity Pt by calculation. Next, in the case when the above-mentioned temperature corrected light intensity Pt is not less than the predetermined power value, for example, a power value not less than the variation of the recording sensitivity of the optical disk 1, or a power value of not less than ±5% of the optimum recording power obtained by power learning in the power calibration area, the (B/A)i correction circuit judges that power correction factors are factors, other than the variation in the sensitivity of the disk, including stresses, such as defocusing, off-tracking and tilting, then corrects the reference value (B/A)i and outputs a corrected reference value (B/A)i' to the corrected power calculation circuit 36.

Figure 17:
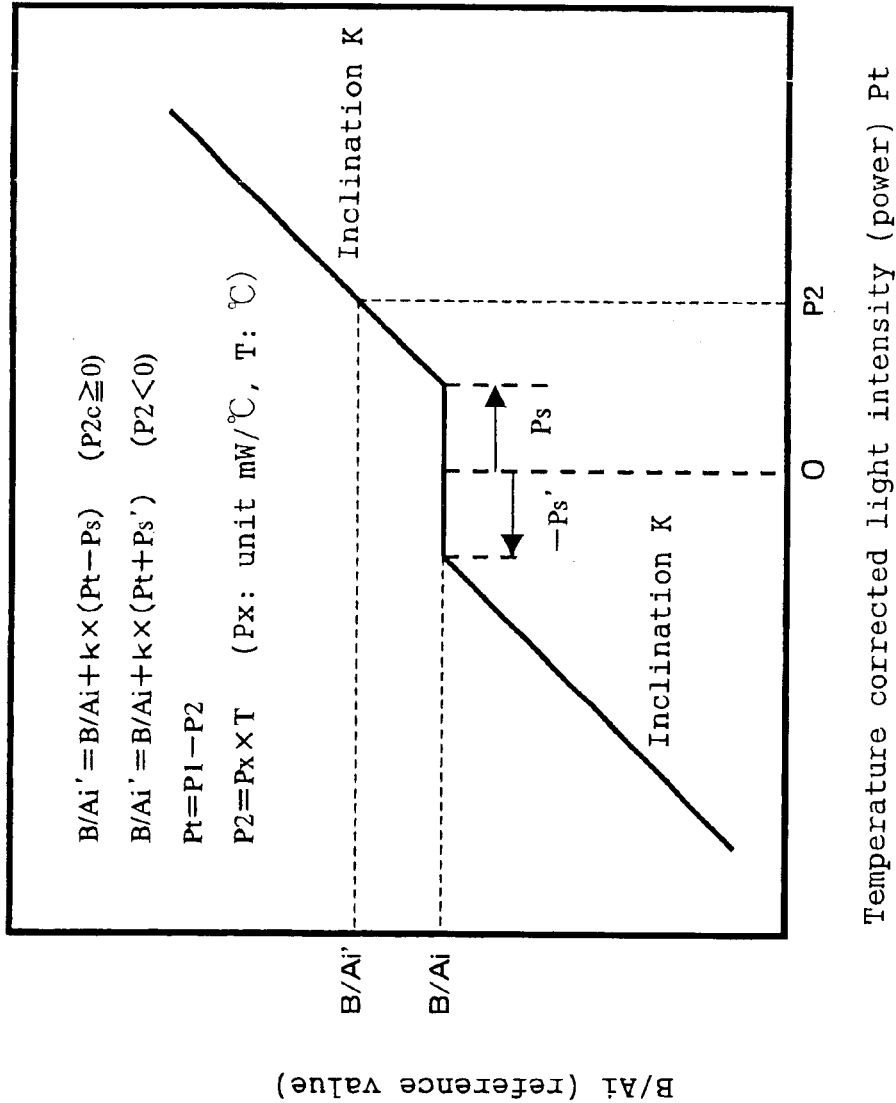
FIG. 17 is a view showing the relationship of the B/Ai reference value with respect to temperature corrected light intensity Pt.

The correction of B/Ai will be described by using drawings. FIG. 17 is a view showing the relationship of the B/Ai reference value with respect to the temperature corrected light intensity Pt. In the figure, the above-mentioned second corrected light intensity P2 is obtained by multiplying an optimum recording power change amount Px per unit temperature, such as ° C., by a temperature change amount T° C. Px is obtained in advance by a temperature change test or the like in combination with an apparatus and a disk, memorized and stored in the apparatus.

$(P2=Px \times T)$

Pt is obtained by subtracting the above-mentioned corrected light intensity P2 from the first corrected light intensity P1.

$(Pt=P1-P2)$

Ps and −Ps' indicate the above-mentioned predetermined values; for example, it is assumed that Ps is +5% and −Ps' is −5% with respect to the optimum recording power Po during B/A learning. In the case when the temperature corrected light intensity Pt is Ps or more, or −Ps' or less, a B/Ai change amount with respect to (Pt−PS) or (Pt+Ps') is obtained by using the inclination k of B/A with respect to Pt, whereby the reference value B/Ai is obtained.

When $Pt \geq 0$, $B/Ai'=B/Ai+k \times (Pt-Ps)$

When $Pt<0$, $B/Ai'=B/Ai+k \times (Pt+Ps')$ (Equation 3)

The method of calculating the inclination k is similar to the contents explained in the first embodiment.

The relationship between the above-mentioned temperature corrected light intensity Pt and the correction amount of the reference value (B/A)i and the above-mentioned predetermined power value have been stored in the information recording apparatus in advance. In the case when the result obtained by power conversion is the predetermined power value or less, the reference value (B/A)i is not corrected, and the reference value (B/A)i is output as (B/A)i' to the corrected power calculation circuit 36.

From the result of the output of the (B/A)i correction circuit 35 and the output of the (B/A)n detector 31, the corrected power calculation circuit 36 obtains a peak power value Pr to be corrected actually, commands the change of the power target value to the peak power control circuit 14 and controls recording power.

In addition, the corrected reference value (B/A)i' becomes the R-OPC control target value of the (B/A)i detector 29, and (B/A)i used as the control target value is renewed as necessary each time correction is carried out.

As described above, in accordance with this embodiment, even if the B/An value used as the R-OPC detection signal is changed by stress, and even if temperature change occurs during recording, power overcorrection of the R-OPC operation due to stress change can be prevented by properly changing B/Ai used as the control target value, and recording can be attained even on an optical disk having dependence on wavelength by carrying out stable and highly accurate power control.

(Third Embodiment)

Next, a third embodiment will be described.

Figure 5:
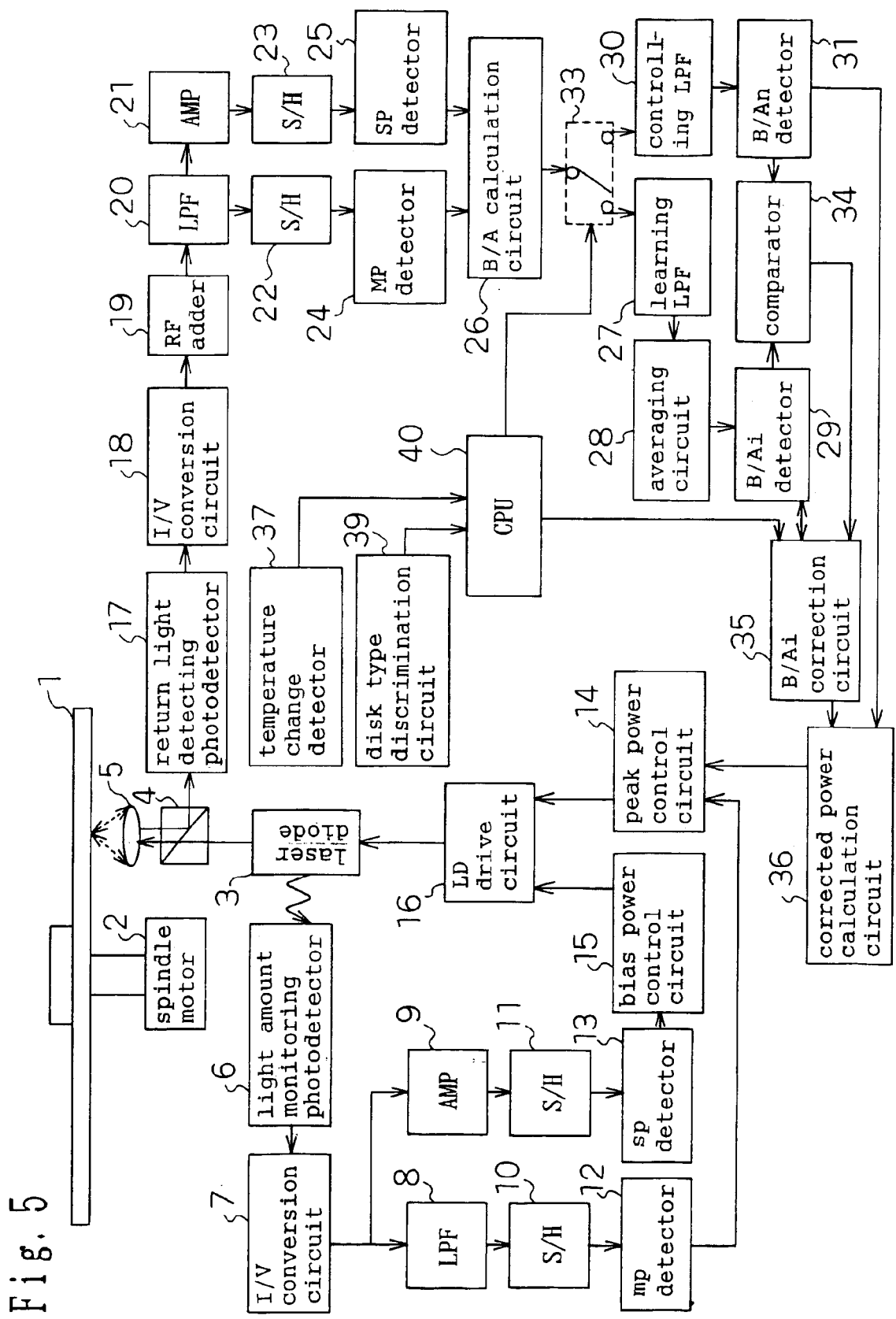
FIG. 5 is a block diagram showing the configuration of an information recording apparatus in accordance with a third embodiment of the present invention.
Figures 1, 12:
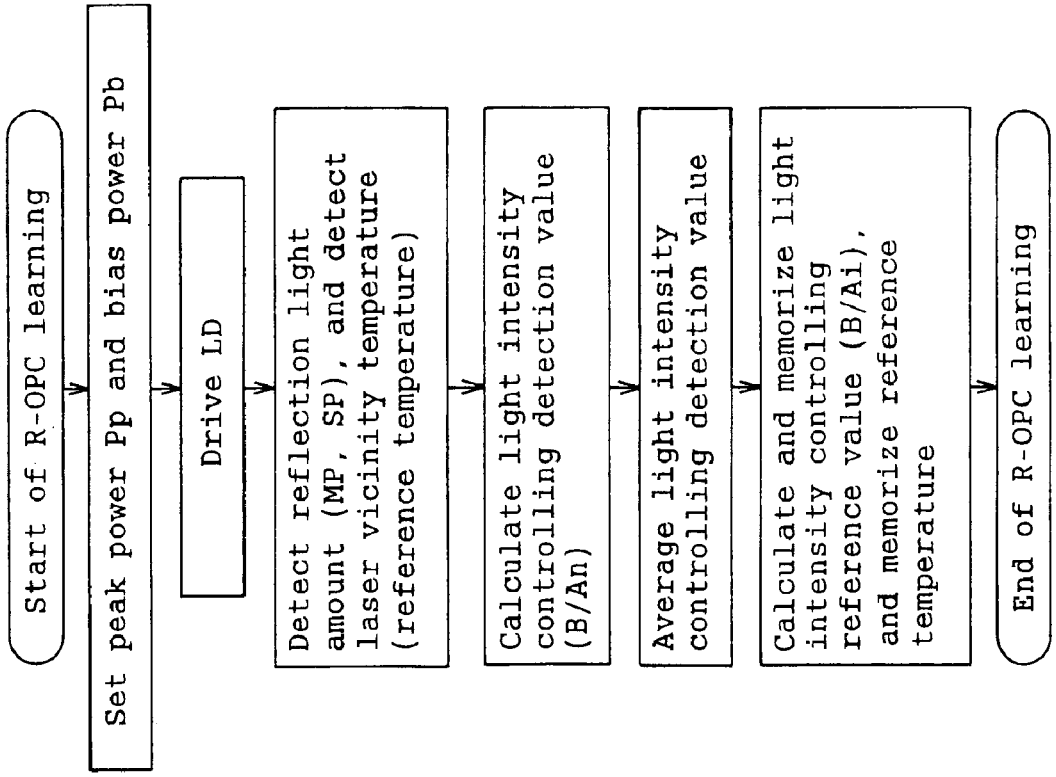
FIG. 12 is a flowchart showing the operation of the third embodiment of the present invention.
Figures 2, 12:
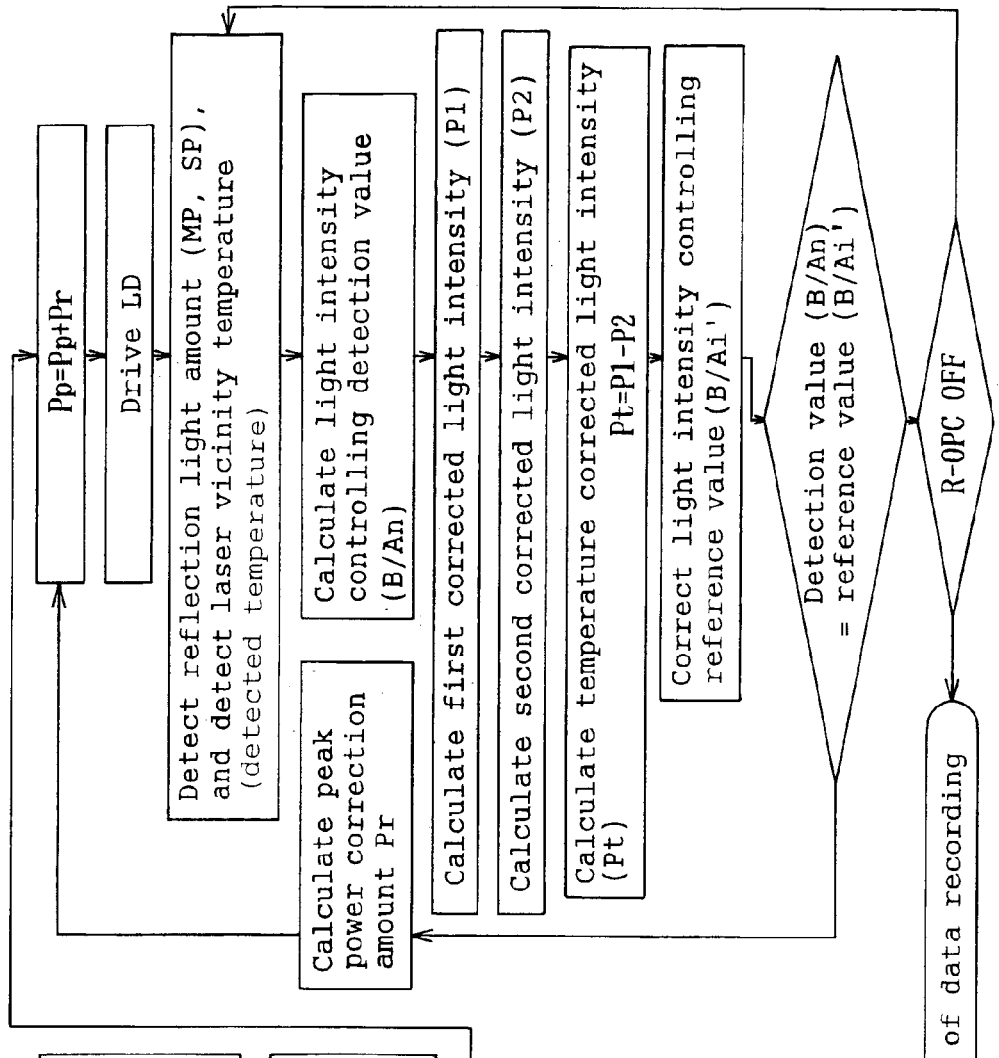
Figure 14:
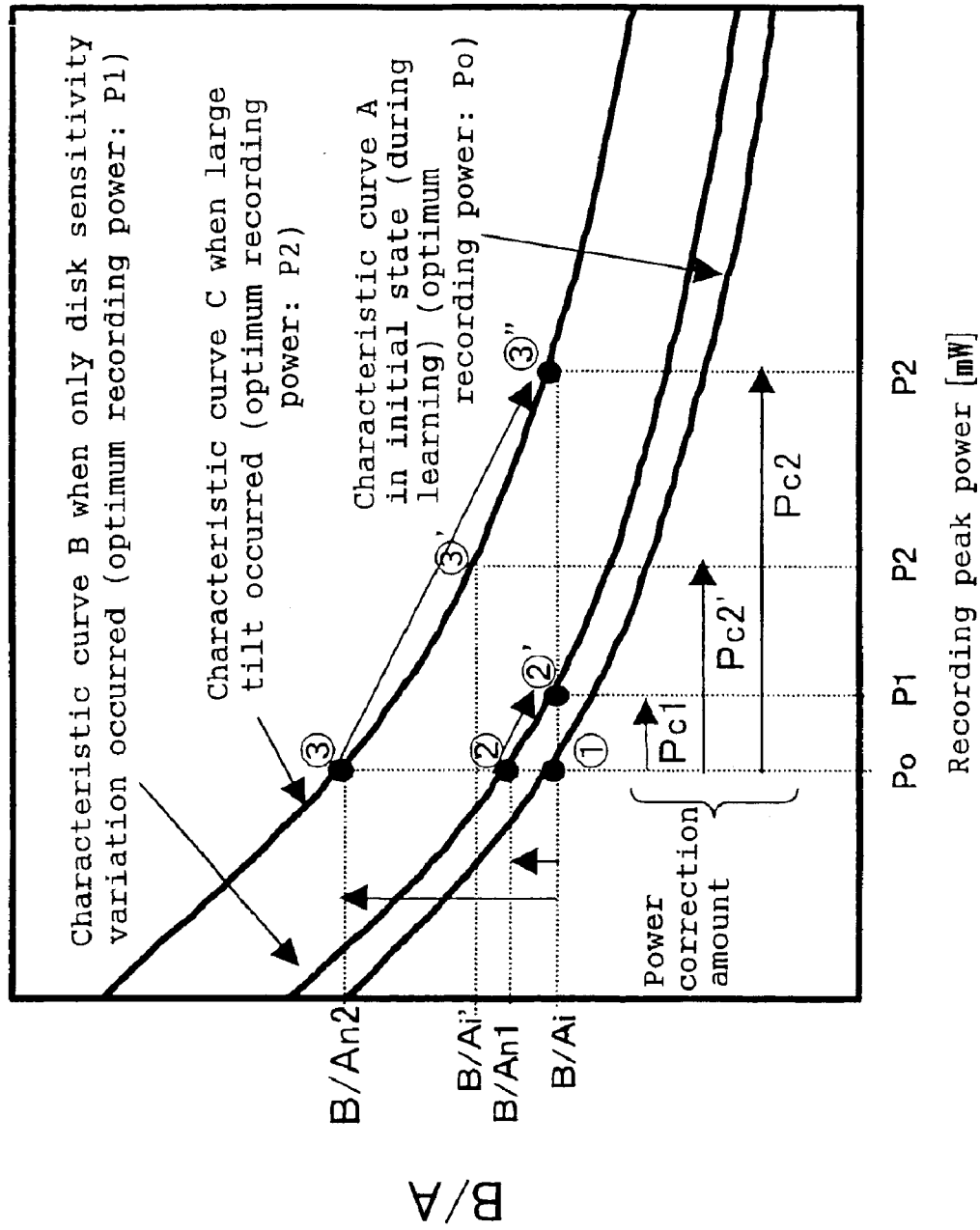
FIG. 14 is a view showing the dependence of the R-OPC detection signal on power in the recording peak power control operation by R-OPC.

FIG. 5 is a block diagram showing the configuration of an information recording apparatus in accordance with this embodiment. FIG. 12 is a flowchart showing the operation of this embodiment.

The information recording method and information recording apparatus in accordance with this embodiment will be described by using FIG. 5 and FIG. 12.

However, components similar to those of the first and second embodiments are not described.

The information recording method and information recording apparatus in accordance with this embodiment comprises an optical disk 1, a spindle motor 2, a laser diode 3, a beam splitter 4, an objective lens 5, a light amount monitoring photodetector 6, an I/V conversion circuit 7, an LPF 8, an AMP 9, an S/H 10, an S/H 11, an mp detector 12, an sp detector 13, a peak power control circuit 14, a bias power control circuit 15, an LD drive circuit 16, return light detecting photodetectors 17, I/V conversion circuits 18, an RF adder 19, an LPF 20, an AMP 21, an S/H 22, an S/H 23, an MP detector 24, an SP detector 25, a B/A calculation circuit 26, a learning LPF 27, an averaging circuit 28, a (B/A)i detector 29, a controlling LPF 30, a (B/A)n detector 31, a switch 33, a comparator 34, a (B/A)i correction circuit 35, a corrected power calculation circuit 36, a temperature change detector 37, a disk type discrimination circuit 39 of discriminating type of disk, and a CPU 40.

Next, the operation of this embodiment will be described.

However, since the contents of the APC operation are similar to those of the first embodiment, the explanation of the APC operation is omitted, and only the portions of the contents of the R-OPC operation, different from the first and second embodiments, are explained.

It is generally known that the change of the optimum recording power due to temperature change and the optimum recording power due to stress change are different depending on the type of an optical disk, for example, the material of the recording film and the manufacturer of the disk. This embodiment is intended to discriminate the type of the disk and to optimize the correction of the R-OPC control target value depending on the disk before recording is carried out on the optical disk.

The operation will be explained briefly.

After the information recording apparatus is turned on, an optical disk is loaded, the spindle motor is rotated, and the disk is started; at this time, the disk type discrimination circuit 39 reads the type of the disk loaded and the manufacturer of the disk from disk control information recorded in advance, and outputs the information regarding the type of the disk and the manufacturer of the disk to the CPU 40.

Depending on the above-mentioned type of the disk and the manufacturer of the disk, the CPU 40 has memorized and stored in advance a corrected light intensity correction table indicating the relationship between the corrected light intensity and the reference value (B/A)i and a light intensity temperature correction table indicating the relationship of the change amount of the optimum recording power due to temperature change with respect to the type of the disk and the manufacturer of the disk, and outputs the relationship between the corrected light intensity and the correction amount of the reference value (B/A)i and the relationship of the change amount of the optimum recording power due to temperature change with respect to the above-mentioned type of the disk and the manufacturer of the disk to the (B/A)i correction circuit 35.

FIG. 18 shows an example of the corrected light intensity correction table and the light intensity temperature correction table as described above. DISC type, which is as many as the number of the disk the apparatus supports, is information showing the type of the disk and the manufacturer of the disk. k is a coefficient (inclination) showing the B/Ai correction amount with respect to the corrected light intensity. Ps shows the power till the B/Ai correction starts, when the corrected light intensity is positive value. −Ps' shows the power till the B/Ai correction starts, when the corrected light intensity is negative value. Px shows the change amount of the optimum recording power per unit temperature.

In the case when a temperature change is detected by the temperature change detector 37, the CPU 40 obtains the change amount of the optimum recording power with respect to the amount of the above-mentioned temperature change, and outputs the change value of the optimum recording power as a second corrected light intensity P2 to the (B/A)i correction circuit 35.

The (B/A)i correction circuit 35 first carries out power conversion on the basis of the difference information of the B/A value and obtains a first corrected light intensity P1, then subtracts the above-mentioned corrected light intensity P2 from the first corrected light intensity P1 thereby to obtain the result of the subtraction as a temperature corrected light intensity Pt by calculation. Next, in the case when the above-mentioned temperature corrected light intensity Pt is not less than the predetermined power value, for example, a power value not less than the variation of the recording sensitivity of the optical disk 1, or a power value of not less than ±5% of the optimum recording power obtained by power learning in the power calibration area, the (B/A)i correction circuit judges that power correction factors are factors, other than the variation in the sensitivity of the disk, including stresses, such as defocusing, off-tracking and tilting, then corrects the reference value (B/A)i and outputs a corrected reference value (B/A)i' to the corrected power calculation circuit 36.

The relationship between the above-mentioned temperature corrected light intensity Pt and the correction amount of the reference value (B/A)i and the above-mentioned predetermined power value have been stored in the information recording apparatus in advance. In the case when the result obtained by power conversion is the predetermined power value or less, the reference value (B/A)i is not corrected, and the reference value (B/A)i is output as (B/A)i' to the corrected power calculation circuit 36.

From the result of the output of the (B/A)i correction circuit 35 and the output of the (B/A)n detector 31, the corrected power calculation circuit 36 obtains a peak power value Pr to be corrected actually, commands the change of the power target value to the peak power control circuit 14 and controls recording power.

As described above, in accordance with this embodiment, even if the B/An value used as the R-OPC detection signal is changed by stress, and even if temperature change occurs during recording, power overcorrection of the R-OPC operation due to stress change can be prevented by properly changing B/Ai used as the control target value depending on the type of the disk and the manufacturer of the disk, and recording can be attained even on various types of optical disks by carrying out stable and highly accurate power control.

(Fourth Embodiment)

Next, a fourth embodiment will be described.

Figure 6:
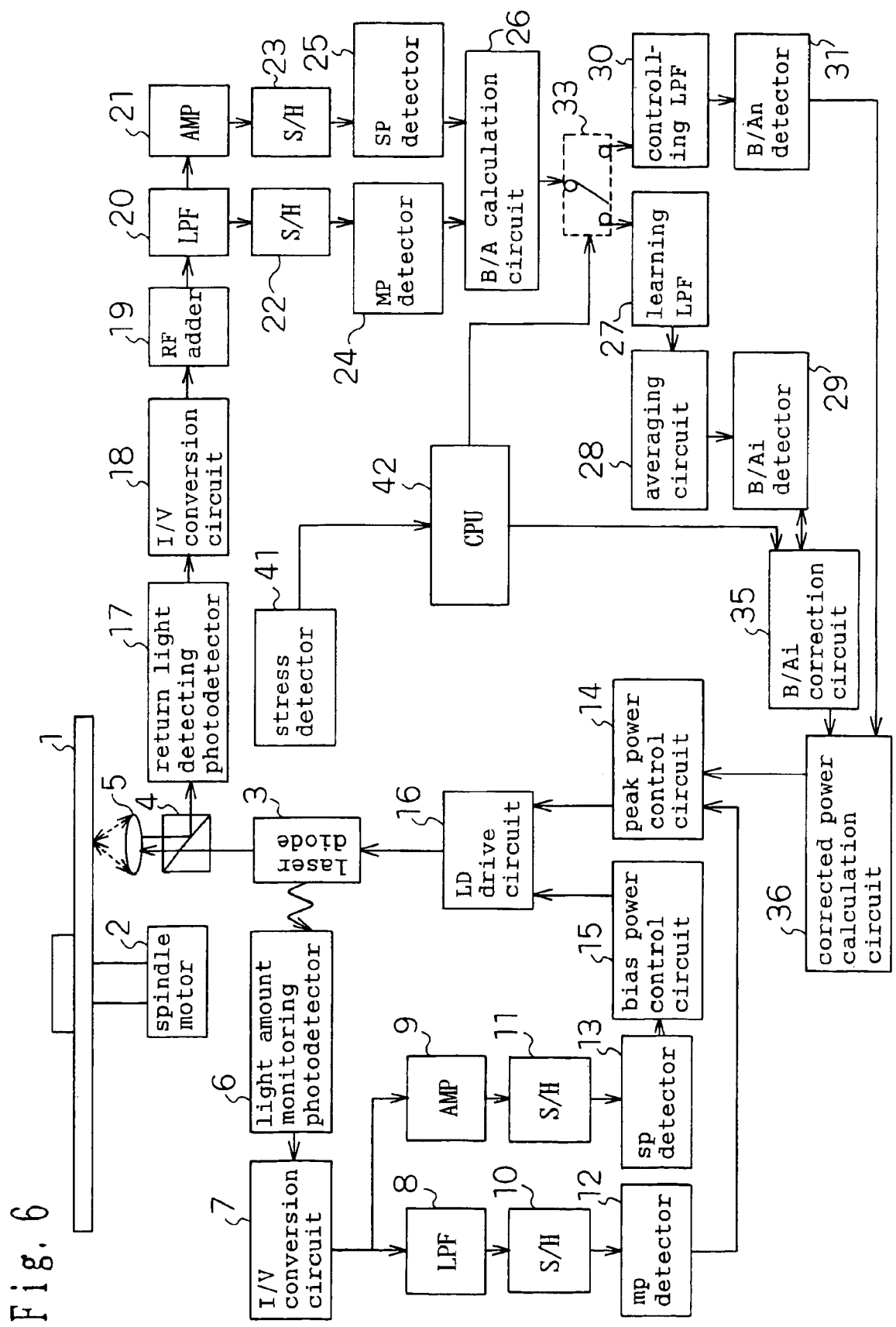
FIG. 6 is a block diagram showing the configuration of an information recording apparatus in accordance with a fourth embodiment of the present invention.
Figure 7:
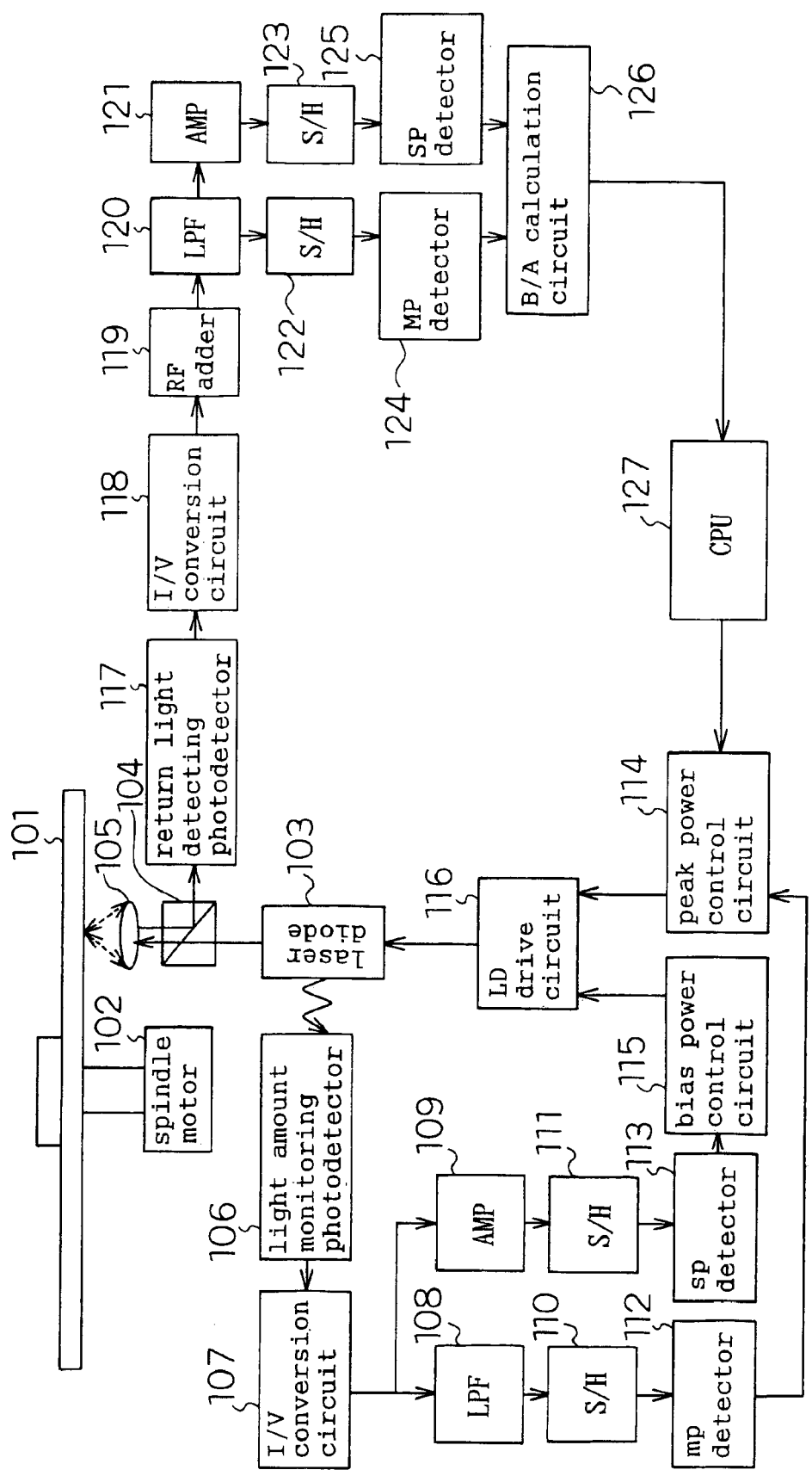
FIG. 7 is a block diagram showing the configuration of the prior art information recording apparatus.
Figure 8:
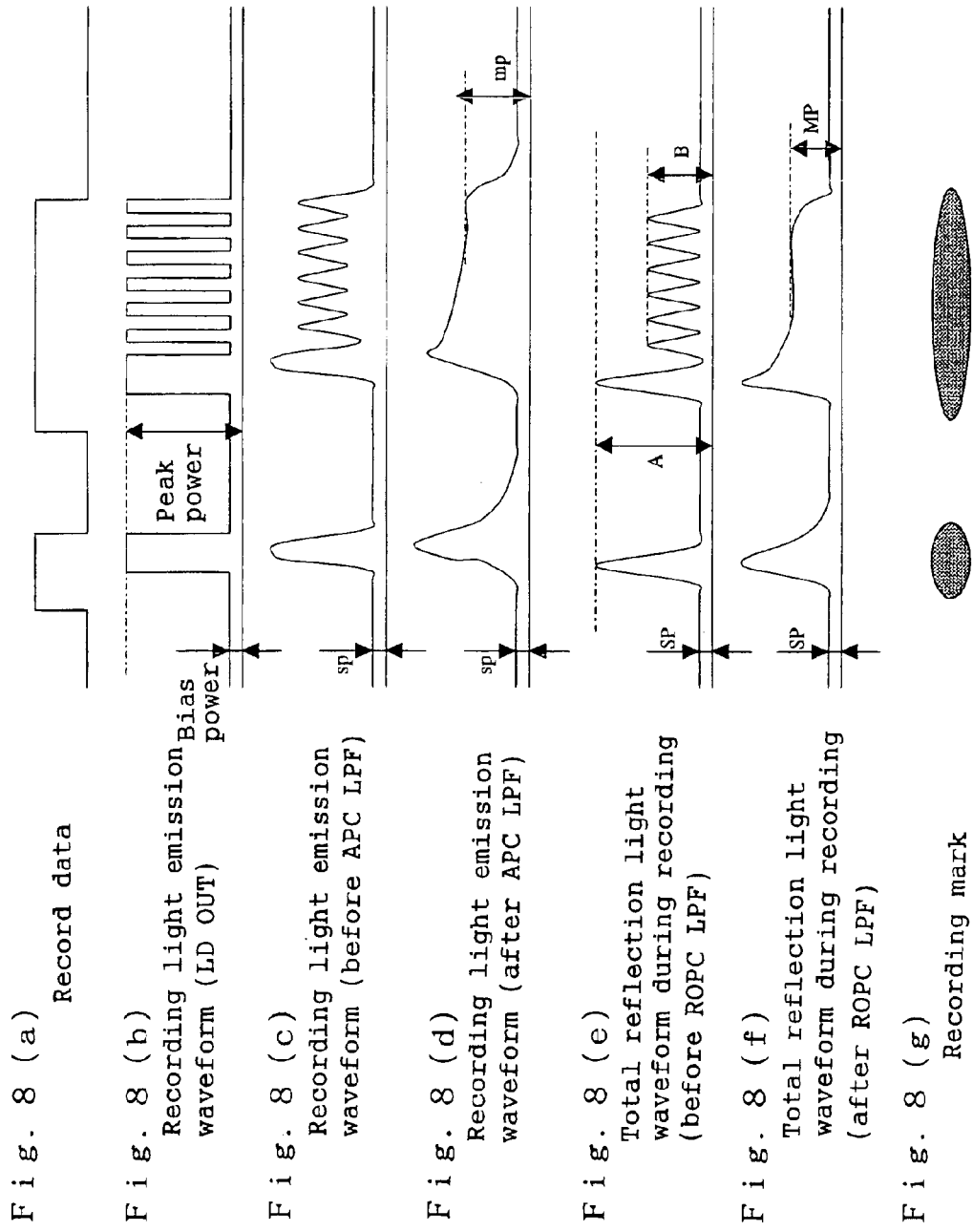
FIG. 8 is a view showing the detection signal waveform for APC and the detection signal waveform for R-OPC.
Figure 9:
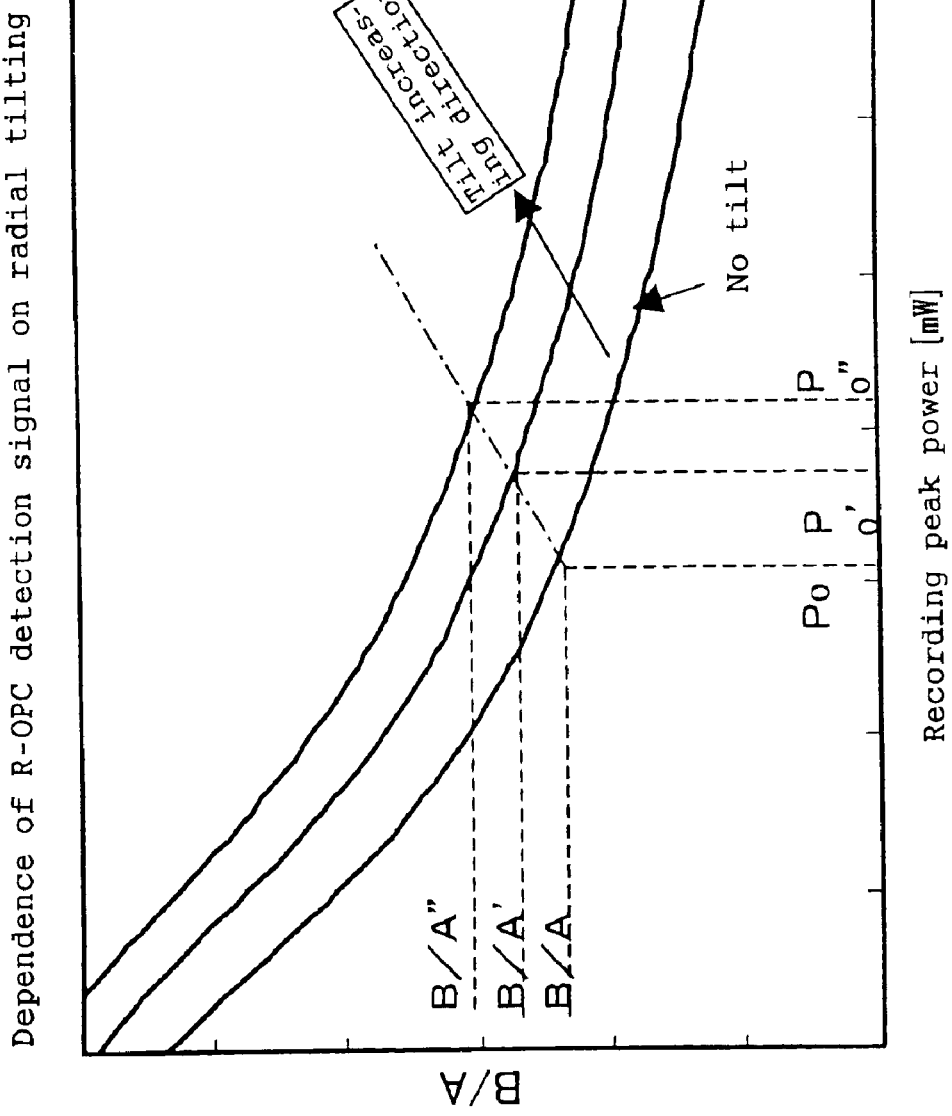
FIG. 9 is a view showing the relationship of the change of the optimum B/A value depending on the change of stress.

FIG. 6 is a block diagram showing the configuration of an information recording apparatus in accordance with this embodiment. FIG. 13 is a flowchart showing the operation of this embodiment.

The information recording method and information recording apparatus in accordance with this embodiment will be described by using FIG. 6 and FIG. 13. However, components similar to those of the first embodiment are not explained.

The information recording method and information recording apparatus in accordance with this embodiment comprises an optical disk 1, a spindle motor 2, a laser diode 3, a beam splitter 4, an objective lens 5, a light amount monitoring photodetector 6, an I/V conversion circuit 7, an LPF 8, an AMP 9, an S/H 10, an S/H 11, an mp detector 12, an sp detector 13, a peak power control circuit 14, a bias power control circuit 15, an LD drive circuit 16, return light detecting photodetectors 17, I/V conversion circuits 18, an RF adder 19, an LPF 20, an AMP 21, an S/H 22, an S/H 23, an MP detector 24, an SP detector 25, a B/A calculation circuit 26, a learning LPF 27, an averaging circuit 28, a (B/A)i detector 29, a controlling LPF 30, a (B/A)n detector 31, a switch 33, a (B/A)i correction circuit 35, a corrected power calculation circuit 36, a stress detector 41 of detecting stress change, and a CPU 42.

Next, the operation of this embodiment will be described. However, since the contents of the APC operation are similar to those of the first embodiment, the explanation of the APC operation is omitted, and only the portions of the contents of the R-OPC operation, different from the first embodiment, are explained.

The stress detector 41 is a tilt sensor capable of detecting the tilt angle between the optical disk 1 and an optical pickup including the laser diode 3 and the objective lens 5, and outputs detected tilt information to the CPU 42. The CPU 42 obtains the B/A correction amount with respect to the detected tilt angle from the B/A correction amount corresponding to the tilt angle stored in the above-mentioned recording apparatus in advance, and command it to the (B/A)i correction circuit 35.

The (B/A)i correction circuit 35 corrects the reference value (B/A)i in accordance with the B/A correction amount commanded by the CPU 42, and outputs a corrected reference value (B/A)i' to the corrected power calculation circuit 36.

From the result of the output of the (B/A)i correction circuit 35 and the output of the (B/A)n detector 31, the corrected power calculation circuit 36 obtains a peak power value Pr to be corrected actually, commands the change of the power target value to the peak power control circuit 14 and controls recording power.

As described above, in accordance with this embodiment, even if the B/An value used as the R-OPC detection signal is changed by tilting, power overcorrection of the R-OPC operation due to tilt change can be prevented by changing B/Ai used as the control target value, and recording can be attained by carrying out stable and highly accurate power control.

In this embodiment, although the stress detected by the stress detector is tilting, the stress may be defocusing or off-tracking. However, the B/A correction amount corresponding to each stress must be stored in the information recording apparatus in advance.

Furthermore, by providing the temperature detector of the second embodiment, the effect similar to that of the second embodiment can be obtained.

Still further, by providing the disk type discrimination circuit of the third embodiment, the effect similar to that of the third embodiment can be obtained.

As clarified by the above descriptions, according to the present invention, in R-OPC wherein laser power control is carried out using return light during recording on an optical disk, even if a stress change, such as defocusing or off-tracking, occurs during recording, even if a temperature change occurs during recording, or even if the type of the disk and the manufacturer of the disk is different, power overcorrection of the R-OPC operation due to the stress change can be prevented by properly changing the R-OPC control target value, and recording can be attained even on various types of optical disks by carrying out stable and highly accurate power control.

What is claimed is:

1. An information recording method of recording information, in which laser light is applied to a recording medium white depending on predetermined information said loser light is modulated and the intensity of said light is controlled to form recording mark areas at which reflectivity of said recording medium changes, depending on the intensity of said applied light, wherein before starting data recording, said light is applied to said recording medium at predetermined light intensity, reflection tight from said recording mark areas of said recording medium is received, the amount of said reflection light is detected, and a light intensity controlling reference value is calculated on the basis of the amount of said detected light, and during data recording, reflection light from said recording mark areas of said recording medium is received, the amount of said reflection light is detected, and a light intensity controlling detection value is calculated on the basis of the amount of said detected light, corrected light intensity is obtained from the difference between said light controlling intensity reference value and said light intensity controlling detection value, said light intensity controlling reference value is corrected depending on said corrected light intensity, and the intensity of said laser light is controlled so that said corrected light intensity controlling reference value substantially coincides with said light intensity controlling detection value.

2. An information recording method in accordance with claim 1, wherein said light intensity controlling reference value to be used for calculating said corrected light intensity is renewed to said corrected light intensity controlling reference value.

3. An information recording method of recording information, in which laser light is applied to a recording medium on which light intensity suited for mark formation changes owing to the change of the wavelength of said laser light depending on temperature change while depending on predetermined information said laser light is modulated and the intensity of said light is controlled to form recording mark areas at which reflectivity of said recording medium changes, depending on the intensity of said applied light, wherein before starting data recording, said light is applied to said recording medium at predetermined light intensity, reflection light from said recording mark areas of said recording medium is received, the amount of said reflection light is detected and laser vicinity temperature is detected simultaneously, a light intensity controlling reference value is calculated on the basis of the amount of said detected light, and the detected temperature is memorized as a reference temperature, and during data recording, reflection light from said recording mark areas of said recording medium is received, the amount of said reflection light is detected, a light intensity controlling detection value is calculated on the basis of the amount of said detected light and laser vicinity temperature is detected simultaneously, first corrected light intensity is obtained from the difference between said light controlling intensity reference value and said light intensity controlling detection value, second corrected light intensity is obtained from the difference between said detected temperature and said reference temperature light intensity obtained by subtracting said second corrected light intensity from said first corrected light intensity is obtained as temperature corrected light intensity, said light intensity controlling reference value is corrected depending on said temperature corrected light intensity, and the intensity of said laser light is controlled so that said corrected light intensity controlling reference value substantially coincides with said light intensity controlling detection value.

4. An information recording method in accordance with claim 3, wherein said light intensity controlling reference value to/be used for calculating said temperature corrected light intensity is renewed to said corrected light intensity controlling reference value.

5. An information recording method is accordance with claim 1 or 3, wherein
calculation of said light intensity controlling reference value and said light intensity controlling detection value is carried out
by detecting the average output of the amount of the reflection light at said recording mark areas after a predetermined time based on a laser light modulation signal has passed, by obtaining the maximum value of the amount of the reflection light at said recording mark areas from the detection value, by calculating the maximum value of the amount of the reflection light at the peak value of the light intensity having been set on the basis of the detection result of the amount of the reflection light at areas, other than recording mark areas, irradiated with light at light intensity not contributing to recording mark formation, and by dividing the maximum value of the amount of the reflection light in said recording mark areas by the calculated maximum value of the amount of the reflection light at the peak value of the light intensity.

6. An information recording method in accordance with claim 1 or 3, wherein
a corrected light intensity correction table indicating the relationship of a reference value correction amount with respect to said corrected light intensity in each type of recording medium is memorized in advance, and said light intensity controlling reference value depending on said corrected light intensity is corrected on the basis of said corrected light intensity correction table after discrimination of the type of the recording medium.

7. An information recording method in accordance with claim 3, wherein
a light intensity temperature correction table indicating the relationship of the change amount of the light intensity suited for mark formation with respect to temperature in each type of recording medium is memorized in advance, and said second corrected light intensity is obtained on the basis of the difference between said detected temperature and said reference temperature and said light intensity temperature correction table.

8. An information recording method of recording information, in which laser light is applied to a recording medium while depending on predetermined information said laser light is modulated and the intensity of said light is controlled to form recording mark areas at which reflectivity of said recording medium changes depending on the intensity of said applied light, wherein before starting data recording, said light is applied to said recording medium at predetermined light intensity, reflection light from said recording mark areas of said recording medium is received, the amount of said reflection light is detected, and a light intensity controlling reference value is calculated on the basis of the amount of the detected light, and during data recording, reflection light from said recording mark areas of said recording medium is received, the amount of said reflection light is detected, a light intensity controlling detection value is calculated on the basis of the amount of said detected light and a stress affecting recording or reproduction on said recording medium as the change of light intensity simultaneously, said light intensity controlling reference value is corrected depending on said stress, and the intensity of said laser light is controlled so that said corrected light intensity controlling reference value substantially coincides with said light intensity controlling detection value.

9. An information recording method in accordance with claim 8, wherein
a stress correction table indicating the relationship of a reference value correction amount with respect to said stress in each type of recording medium is memorized in advance, and said light intensity controlling reference value depending on said stress is corrected on the basis of said stress correction table after discrimination of the type of the recording medium.

10. An information recording apparatus of recording information, in which laser light is applied to a recording medium while depending on predetermined information said laser light is modulated and the intensity of said light is controlled to form recording mark areas at which reflectivity of said recording medium changes, depending on the intensity of said applied light, comprising:
outgoing light around controlling means of detecting the amount of outgoing laser light and of controlling the amount of the outgoing laser light so as to obtain a predetermined power value,
reflection light amount detecting means of receiving reflection light from the recording mark areas of said recording medium and of detecting the amount of the reflection light,
light intensity controlling detection signal generating means of generating a light intensity controlling detection signal on the basis of the amount of the detected light of said reflection light amount detecting means,
reference value generating means of applying light in advance to said recording medium at predetermined light intensity before starting data recording and of generating a light intensity controlling reference value from said light intensity controlling detection signal,
light intensity controlling detection value generating means of generating a light intensity controlling detection value from said light intensity controlling detection signal during data recording,
switching means of switching the output of said light intensity controlling detection signal to said reference value generating means or said light intensity controlling detection value generating means,
reference value correcting means of obtaining corrected light intensity from the difference between said reference value and said light intensity controlling detection value and of correcting said reference value depending on said corrected light intensity, and corrected power value generating means of generating a corrected power value from the difference between said reference value corrected by said reference value correcting means and said light intensity controlling detection value and of outputting said corrected power value to said outgoing light amount controlling means.

11. An information recording apparatus of recording information, in which laser light is applied to a recording medium on which light intensity suited for mark formation changes owing to the change of the wavelength of said laser light depending on temperature change while said laser light is modulated and the intensity of said light is controlled depending on predetermined information to form recording mark areas at which the reflectivity of said recording medium changes depending on the intensity of said applied light, comprising;

outgoing light amount controlling means of detecting the amount of outgoing laser light and of controlling the amount of the outgoing laser light so as to obtain a predetermined power value, reflection light amount detecting means of receiving reflection light from the recording mark areas of said recording medium and of detecting the amount of the reflection light, light intensity controlling detection signal generating means of generating a light intensity controlling detection signal on the basis of the amount of the detected light of said reflection light amount detecting means, temperature detecting means of detecting laser vicinity temperature, reference value generating means of applying light in advance to said recording medium at predetermined light intensity before starting data recording and of generating light intensity controlling reference value from said light intensity controlling detection signal, reference temperature memorizing means of memorizing the result of detection after the laser vicinity temperature at the time of the generation of said reference value is detected by said temperature detecting means, light intensity controlling detection value generating means of generating a light intensity controlling detection value from said light intensity controlling detection signal during data recording, detected temperature memorizing means of memorizing the result of detection after the laser vicinity temperature at the time of the generation of said light intensity controlling detection value is detected by sold temperature detecting means, switching means of switching the output of said light intensity controlling detection signal to said reference value generating means or sold light intensity controlling detection value generating means, first corrected light intensity generating means of calculating first corrected light intensity from the difference between said reference value and said light intensity controlling detection value, second corrected light intensity generating means of calculating second corrected light intensity from the difference between said detected temperature and said reference temperature, temperature corrected light intensity generating means of generating temperature corrected light intensity by subtracting said second corrected light intensity from said first corrected light intensity, reference value correcting means of correcting said reference value depending on said temperature corrected light intensity, and corrected power value generating means of generating a corrected power value from the difference between said reference value corrected by said reference value correcting means and said light intensity controlling detection value and of outputting said corrected power value to said outgoing light amount controlling means.

12. An information recording apparatus in accordance with claim 10 or 11, wherein said light intensity controlling detection signal generating means comprises:

a low-pass filter of averaging the output of said reflection light amount detecting means, a sample-and-hold circuit of detecting the output of said low-pass filter after a predetermined time based on a laser light modulation signal, mark area reflection light amount maximum value generating means of obtaining the maximum value of the amount of reflection light at recording mark areas from a value detected by said sample-and-hold circuit and the duty ratio of outgoing power contributing to mark formation, peak power reflection light amount maximum value generating means of calculating the peak amount of reflection light at the peak value of light intensity having been set on the basis of the result of the detection of the amount of reflection light at areas, other than the recording mark areas, irradiated with light at light intensity not contributing to recording mark formation, and a division circuit of dividing said maximum value of the amount of reflection light at said recording mark areas by the maximum value of the peak power amount of reflection light and of generating a light intensity controlling detection signal.

13. An information recording apparatus in accordance with claim 10 or 11, comprising recording medium type discrimination means and means of memorizing corrected light intensity correction table indicating the relationship of the correction amount of said reference value with respect to said corrected light intensity in each type of recording medium in advance.

14. An information recording apparatus in accordance with claim 10 of 11, comprising recording medium type discrimination means and means of memorizing light intensity temperature correction table indicating the relationship of the change amount of light intensity suited for mark formation with respect to temperature in each type of recording medium in advance.

15. An information recording apparatus of recording information in which laser light is applied to a recording medium while depending on predetermined information said laser light is modulated and the intensity of sad light is controlled to form recording mark areas at which reflectivity of said recording medium changes, depending on the intensity of said applied light, comprising:

outgoing light amount controlling means of detecting the amount of outgoing laser light and of controlling the amount of the outgoing laser light so as to obtain a predetermined power value, reflection light amount detecting means of receiving reflection light from the recording mark areas of said recording medium and of detecting the amount of the reflection light, light intensity controlling detection, signal generating means of generating a light intensity controlling detection signal on the basis of the amount of the detected light of said reflection light amount detecting means, reference valve generating means of applying light in advance to said recording medium at predetermined light intensity before starting data recording and of generating a light intensity controlling reference value from said light intensity controlling detection signal from, light intensity controlling detection value generating means of generating a light intensity controlling detection value from said light intensity controlling detection signal during data recording, switching means of switching the output of said light intensity controlling detection signal to said reference value generating means or said light intensity controlling detection value generating means, stress detecting means of detecting stress affecting recording or reproduction on said recording medium as the change of light intensity, reference value correcting means of correcting said light intensity controlling reference value depending on said stress, corrected power value generating means of generating a corrected power value from the difference between said reference value corrected by said reference value correcting means and said light intensity controlling detection value and of outputting said corrected power value to said outgoing light amount controlling means.

16. An information recording apparatus in accordance with claim 15, comprising recording medium type discrimination means and means of memorizing stress correction table indicating the relationship of the correction amount of said reference value with respect to said stress in each type of recording medium in advance.

* * * * *